(12) United States Patent
McConnell et al.

(10) Patent No.: US 10,540,332 B2
(45) Date of Patent: Jan. 21, 2020

(54) EFFICIENT DENORMALIZATION OF DATA INSTANCES

(71) Applicant: Microsoft Technology Licensing, LLC, Redmond, WA (US)

(72) Inventors: Christopher Clayton McConnell, Redmond, WA (US); Weipeng Liu, Bellevue, WA (US); Shahin Shayandeh, Seattle, WA (US); Robert Lovejoy Goodwin, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 681 days.

(21) Appl. No.: 15/227,745

(22) Filed: Aug. 3, 2016

(65) Prior Publication Data

US 2018/0039656 A1 Feb. 8, 2018

(51) Int. Cl.
- *G06F 16/21* (2019.01)
- *G06F 16/22* (2019.01)
- *G06F 16/23* (2019.01)
- *G06F 16/9535* (2019.01)

(52) U.S. Cl.
CPC ........ *G06F 16/211* (2019.01); *G06F 16/2228* (2019.01); *G06F 16/2379* (2019.01); *G06F 16/9535* (2019.01)

(58) Field of Classification Search
USPC ........................................................ 707/748
See application file for complete search history.

(56) References Cited

U.S. PATENT DOCUMENTS

| 8,239,505 | B2 | 8/2012 | Sedukhin et al. |
| 9,031,932 | B2 | 5/2015 | Idicula et al. |
| 9,171,065 | B2 | 10/2015 | Raghavan et al. |
| 9,223,899 | B2 | 12/2015 | Singh et al. |
| 2012/0031091 | A1 | 2/2012 | Mungas et al. |

(Continued)

OTHER PUBLICATIONS

Junghanns, Martin "GRADOOP: Scalable Graph Data Management and Analytics with Hadoop" Published Jun. 2015, Proceedings of University of Leipzig arXiv:1506.00548v2 [cs.DB] Jun. 2, 2015, 17 pps.

(Continued)

*Primary Examiner* — Muluemebet Gurmu
(74) *Attorney, Agent, or Firm* — Shook, Hardy & Bacon L.L.P.

(57) ABSTRACT

Technologies are described herein for denormalizing data instances. Schemas for data instances are embedded with annotations indicating how the denormalization is to be performed. Based on the annotations, one or more sub per object indexes ("sub POIs") can be generated for each data instance and stored. The sub POIs can include a target sub POI containing data from the data instance, and at least one source sub POI containing data from another data instance, if the data instance depends on the other data instance. Data instance updates can be performed by identifying sub POIs that are related to the updated data instance in storage, and updating the related sub POIs according to the update to the data instance. The sub POIs can be sent to an indexing engine to generate an index for a search engine to facilitate searches on the data instances.

20 Claims, 10 Drawing Sheets

(56) References Cited

U.S. PATENT DOCUMENTS

2014/0324882 A1* 10/2014 Giovanni et al. ....... G06F 17/30 707/742
2015/0302058 A1* 10/2015 Li et al. .................. G06F 17/30 707/714

OTHER PUBLICATIONS

Web article: Katsov, Ilya "NoSQL Data Modeling Techniques" published Mar. 1, 2012 by Wordpress.com [online][retrieved on: Feb. 12, 2016] retrieved from: https://highlyscalable.wordpress.com/.../nosql-data-modeling-techniques/, 12 pps.

Web article: Meier, J.D. "Chapter 14—Improving SQL Server Performance" [online][retrieved on Feb. 12, 2016] retrieved from: https://msdn.microsoft.com/en-us/library/ff647793.aspx, 31 pps.

Shao, Bin "Trinity: A Distributed Graph Engine on a Memory Cloud" published Jun. 22, 2013 in Proceedings of the ACM SIGMOD International Conference on Management of Data, 12 pps.

Vajk, Tamas "Constraint Validation-Based Performance Optimizations in Domain-Specific Modeling Environments" Ph. D. Thesis of Tamas Vajk, Budapest University of Technology and Economics, 127 pps.

"International Search Report and Written Opinion Issued in PCT Application No. PCT/US2017/044057", dated Oct. 16, 2017, 13 Pages.

Singh, et al."A Convenient Way From Normalized Database to Denormalized Database", In International Journal of Computer Communication and Information System, vol. 2, Issue 1, Jul. 2010, pp. 84-87.

* cited by examiner

EFFICIENT DENORMALIZATION OF DATA INSTANCES

BACKGROUND

As information becomes more and more connected across multiple systems, it is beneficial to be able to quickly gather data from these multiple systems to support various scenarios, such as responding to a search query. On the other hand, the large amount of data available in such systems can make the task of updating data and maintaining data consistency very difficult. To solve such a problem, data is typically normalized when stored in a data store. Such a normalization process organizes the attributes and relations of a data store to reduce or even eliminate data redundancy in the stored data.

Updating normalized data becomes relative easy because data is stored in one place and the updating only needs to be performed once. Querying the normalized data, however, becomes time consuming because the search typically involves joining multiple tables, which can be very computationally expensive, particularly when there are a large number of such joining steps. For example, a user might submit a query for books written by authors with a certain last name. In a normalized data model, book data might be stored in a table separate from the table storing the author data. The book data might have a reference to its corresponding authors, but the detailed information about the authors, such as their last names, are stored in the author table. To respond to the search query, the book table and the author table have to be joined in order to determine the last names of the authors of each book.

To reduce the search time and the number of operations performed on the data, the normalized data can be denormalized to introduce some redundant information in order to support certain scenarios. In the above example, for instance, the book data can be denormalized to include the last names of authors from the author table beforehand. An index based on authors' last names can then be built for the book table so that when the query is received, the results can be quickly identified by a look up on the index without performing a join operation.

Data denormalization, however, is typically performed manually and often by people other than those who perform data updates. This can cause difficulties in updating data and in maintaining data consistency, the very problem data normalization tries to solve in the first place.

It is with respect to these and other considerations that the disclosure made herein is presented.

SUMMARY

Technologies are described herein for denormalizing data instances. A data instance can be a data entry containing instantiation values for fields or elements defined in its corresponding data store schema. Information for denormalizing data instances can be embedded in their corresponding data store schemas as annotations. The annotations can specify the fields or elements of the data structure defined in a schema that are to be used as an index. The annotation can also include a reference to other data instances on which the denormalization is relied on. The annotated schemas can be registered with a denormalization engine.

As data instances of the annotated schemas are received, the denormalization engine can process each data instance according to the annotation to generate a per object index ("POI") for each data instance of the annotated schema. The POI can include a target sub POI containing information obtained from the data instance itself. The POI might also include one or more source sub POIs containing information from other data instances that the data instance depends upon. The denormalization engine can request the generated POIs be stored in POI storage.

More specifically, when a new data instance or an update to an existing data instance is received at the denormalization engine, the denormalization engine can request all sub POIs that are related to the data instance currently being processed from POI storage. The denormalization engine can then analyze the schema annotation associated with each related sub POI to obtain instantiation values from the current data instance to update the related sub POIs. Updates to the related sub POIs might include adding new sub POIs, deleting existing sub POIs, changing the values of existing sub POIs, or transforming existing sub POIs. These sub POI updates can then be utilized to update the sub POIs stored in the POI storage.

The POI storage can expose the stored sub POIs to various indexing engines that can generate an index suitable for their corresponding search engines to facilitate searching operations. The search engines can also gather received search queries and send them to the denormalization engine. The denormalization engine can analyze the received search queries to infer denormalization to be performed and to make recommendations for annotating the schema to enable the denormalization.

By utilizing the techniques described herein, normalized logical models are kept unchanged while multiple denormalized physical models can be maintained and optimized. The techniques described herein not only improve search speed, but also improve the data consistency of the denormalized data store in that an update to a data instance can be automatically propagated to all the copies in the system. Other technical effects not specifically identified herein can also be realized through an implementation of the disclosed technologies.

It should be appreciated that the above-described subject matter can also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
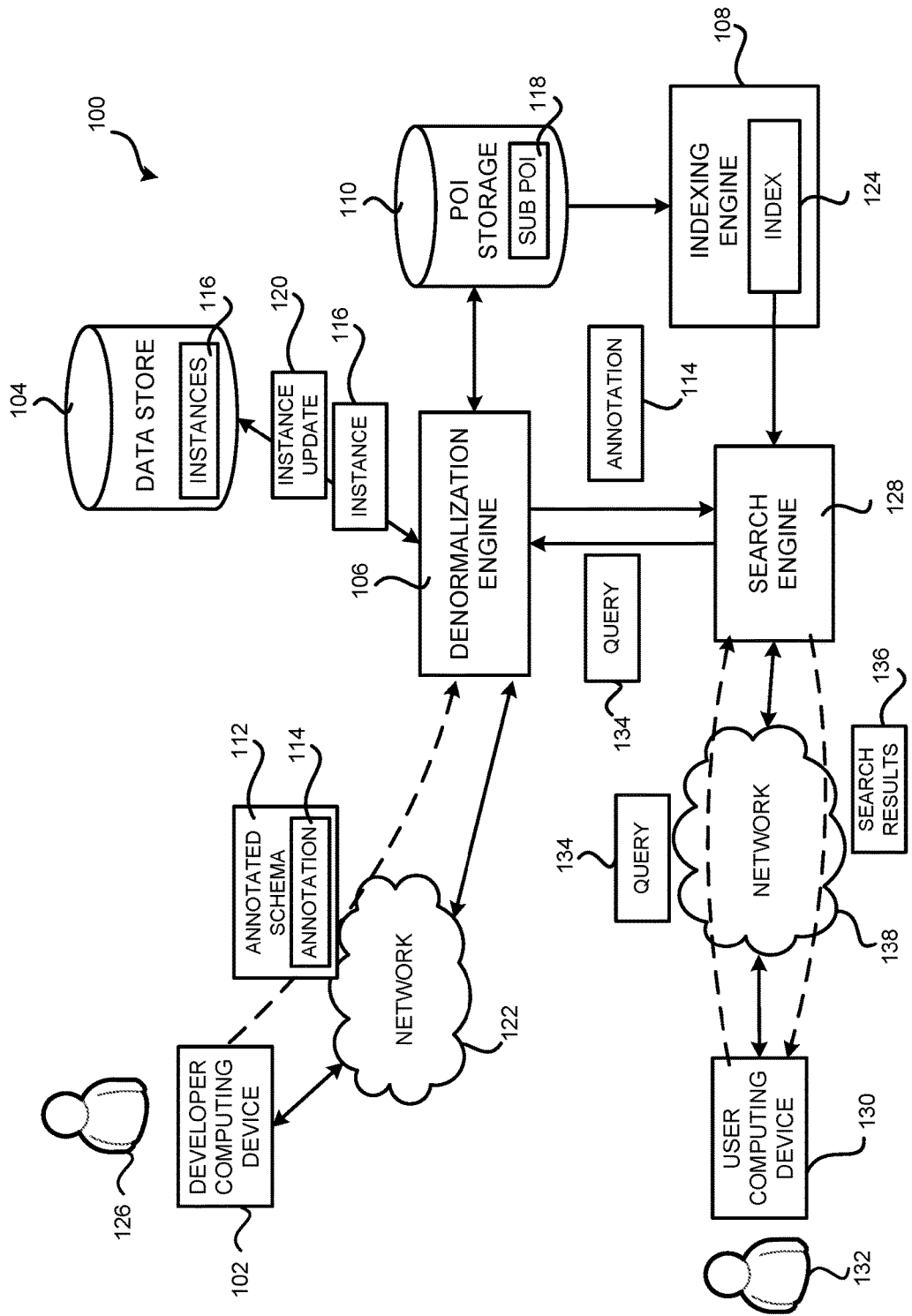
FIG. 1 is a computer system diagram providing an overview description of one mechanism disclosed herein for denormalizing data instances.

Technologies are described herein for denormalizing data instances to enable quick search and analysis on the data instance while maintaining the consistency of the data instances. A data instance can be a data entry containing instantiation values for fields or elements defined in its corresponding data store schema. For example, if a data store schema defines a table, a data instance of the schema can be a row or a record of the table containing actual values for the fields or columns of the table. In technologies disclosed herein, data denormalization is implemented through generating and maintaining a per object index ("POI") for a data instance to be denormalized, which will be referred to herein as a "target data instance." The POI is generated by processing the target data instance and data instances that the target data instance depends upon, which are referred to herein as "source data instances."

The POI consists of one or more sub POIs, with one target sub POI containing data obtained from the target data instance, and others as source sub POIs containing data from source data instances. These sub POIs contain all the data required to index the data instance and, therefore, can be made available to an indexing engine to generate the index for a search engine.

To enable the generation of the sub POIs, data store schemas that describe the data structure of a data store are annotated with information specifying how the data denormalization is to be performed on data instances of the schemas. The annotated schemas are then registered with a denormalization engine configured to perform data denormalization.

When a new data instance of an annotated schema is received at the denormalization engine, the denormalization engine can analyze the annotation embedded in the schema and obtain information from the data instance to generate a target sub POI. If the data instance depends on one or more source data instances, a source sub POI can be created for each of the source data instances to track dependencies between the target data instance and the source data instances. Data in the source sub POIs can be obtained when the corresponding source data instance is processed by the denormalization engine. The newly generated sub POIs can then be stored in POI storage.

It should be noted that this new data instance can be a source data instance for another target data instance. In such a scenario, data of the new data instance can be utilized to fill in the corresponding source sub POI for the other target data instance. To ensure those source sub POIs are updated with the data in the new data instance, all existing sub POIs that are related to or otherwise require data from the new data instance are retrieved from POI storage and processed according to the data contained in the new data instance. The updated sub POIs are then sent to POI storage to update the corresponding sub POIs. Similarly, when an update to an existing data instance is received, all of the sub POIs that are related to the data instance can be retrieved and updated according to the update to the data instance.

The sub POIs described above inherently support forward referencing and also are capable of handling cycles without infinite cascade. In addition to generating an index for a search engine, the sub POIs can also be utilized to perform various analyses on the data instances with low computational cost. Additional details regarding these and other aspects of the technologies presented herein will be provided below with regard to FIGS. 1-7.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific aspects or examples. Referring now to the drawings, in which like numerals represent like elements throughout the several figures, aspects of a computing system and methodology for subscribing, receiving and processing events will be described.

Turning now to FIG. 1, details will be provided regarding a computer system for denormalizing data instances according to aspects presented herein. In particular, FIG. 1 shows aspects of a denormalization system 100 for denormalizing data instances. As shown in FIG. 1, the denormalization system 100 includes a data store 104 for storing and maintaining data instances 116 (which might be referred to herein as instances 116), a denormalization engine 106 configured to perform denormalization on the data instances 116 by generating sub POIs 118 for the data instances 116, and a POI storage 110 configured to store and maintain the sub POIs 118.

The functionality of the POI storage 110 can be provided by one or more databases, server computers, desktop computers, mobile telephones, laptop computers, other computing systems, and the like. It should be understood that the functionality of the POI storage 110 also can be provided by one or more virtual machines and/or otherwise hosted by a cloud computing environment, if desired. In other embodiments, the functionality of the POI storage 110 can be provided by one or more data storage devices associated with a computing device such as a memory, a mass storage device, computer-readable storage media as defined herein, combinations thereof, and the like. For example, the functionality of the POI storage 110 can be implemented as a server computer configured to maintain data describing the relationships between the sub POIs 118 stored therein, and to perform operations such as retrieving related sub POIs 118 for a given sub POI, creating/adding new sub POIs 118, removing sub POIs 118, changing values of existing sub POIs 118 and applying transforms on the sub POIs 118. A transform on a sub POI 118 can include a change to a value of an element of the sub POI 118, such as an addition to the value of the element, a decrease to the value, or any commutative operations on the value. It should be understood that this example is illustrative, and should not be construed as being limiting in any way.

The denormalization engine 106 can be configured to provide various types of functionality to facilitate the denormalization of data instances 116 in the data store 104. The denormalization engine 106 can be implemented as hardware or software executed by hardware. In some configurations, the denormalization engine 106 can execute a number of modules in order to facilitate the data denormalization. The modules can execute on a single computing device or in parallel across multiple computing devices. In addition, each module can consist of a number of subcomponents executing on different computing devices. The modules can be implemented as hardware or software executed by hardware.

The denormalization engine 106 can be in communication with one or more developer computing devices 102. The developer computing device 102 can be a PC, a desktop workstation, a laptop or tablet, a notebook, a PDA, an electronic book reader, a smartphone, a game console, a set-top box, a consumer electronics device, a wearable computing device, a server computer, or any other computing device capable of communicating with the denormalization engine 106 through a network 122.

The network 122 can be any wired network, wireless network, or combination thereof. In addition, the network 122 can be a personal area network, local area network ("LAN"), wide area network ("WAN"), cable network, satellite network, cellular telephone network, or combination thereof. The network 122 can also be an over-the-air broadcast network (e.g., for radio or television) or a publicly accessible network of linked networks, possibly operated by various distinct parties, such as the Internet. In some implementations, the network 122 can be a private or semi-private network, such as a corporate or university intranet. The network 122 can include one or more wireless networks, such as a Global System for Mobile Communications ("GSM") network, a Code Division Multiple Access ("CDMA") network, a Long Term Evolution ("LTE") network, or any other type of wireless network.

A developer or administrator 126 of the data store 104 can utilize the developer computing device 102 to submit an annotated schema 112 to the denormalization engine 106 over the network 122. The annotated schema 112 can be a data store schema defining the data structure of the data store 104 and embedded with an annotation 114 specifying how the data denormalization should be performed on data instances of the schema 112. Additional details regarding the annotated schema 112 and the annotation 114 are described below with regard to FIGS. 2-4. When the annotated schema 112 is received, the denormalization engine 106 can register the annotated schema 112 for later use.

When a new instance 116 of the annotated schema 112 is created in the data store 104, the instance 116 will be processed at the denormalization engine 106 for denormalization as a target instance. Specifically, the denormalization engine 106 can analyze and evaluate the annotation 114 in the annotated schema 112 using the specific values contained in the target data instances 116, referred to herein as "instantiation values." Such instantiation values are then utilized to generate one or more sub POIs 118.

The sub POIs 118 can include a target sub POI 118 that contains information from the target data instance 116 itself. If the target data instance 116 depends on one or more source data instances 116 and the annotation 114 indicates that the denormalization of the target data instances 116 requires information from those source data instances 116, a source sub POI 118 can be generated for each of the source data instances 116. The information in the source sub POIs 118 can be populated when the corresponding source data instance 116 is processed by the denormalization engine 106. The generated sub POIs 118 can then be sent to the POI storage 110 for storage.

When processing the new instance 116, the denormalization engine 106 can also examine the existing sub POIs stored in the POI storage 110 to determine if there is any sub POI that is related to the new data instances 116. For example, a source sub POI for another data instance can be related to the new data instance 116 if the new data instance 116 is a source data instance for the other data instance and thus is required to fill or update in the source sub POI. The new data instance can also be related to a sub POI if the new data instance changes the value of data contained in that sub POI. For instance, in one example the new instance is a book instance presenting a new book written by a certain author. A sub POI containing the total number of books written by this author is thus related to the new data instance in that the new data instance would cause the total number of books in the sub POI to be increased by one.

It should be understood that a new instance can be related to an existing sub POI in other ways. When there are sub POIs related to the new data instance, these related sub POIs can be retrieved from the POI storage 110 and further processed by the denormalization engine 106 utilizing the data contained in the new instance 116. The processed and updated sub POIs can then be sent back to the POI storage 110.

The denormalization engine 106 can also be configured to handle instance updates 120. For example, a data instance 116 in the data store 104 can be updated for some reasons, such as to correct an error in the data instance 116, or to replace a field of the data instance 116 with the latest information. When the denormalization engine 106 receives such an update 120, all the sub POIs 118 that are related to the instance update 120 can be retrieved from the POI storage 110. The denormalization engine 106 can then process the related sub POIs based on the instance update 120 to generate sub POI updates to update the sub POIs 118 stored in the POI storage 110.

Depending on the specific change made by the instance update 120, the sub POI updates can include newly created sub POIs 118, a change to an existing sub POI 118, an indication to delete an existing sub POI 118, or a transform to an existing sub POI 118. Upon receiving the sub POI updates, the POI storage 110 can update the POI storage based on the sub POI updates, including, but not limited to, adding new sub POIs into the POI storage 110, removing sub POIs indicated as to be deleted, changing existing sub POIs or applying transforms on the sub POIs. Additional details regarding the generation and the update of sub POIs 118 are provided below with regard to FIGS. 2-6.

According to further aspects described herein, the POI storage 110 can also be configured to expose the sub POIs 118 stored therein to an indexing engine 108 to generate an index 124 suitable for a corresponding search engine 128. This can be performed by, for example, the indexing engine 108 subscribing to the POI storage 110 to receive the sub POIs and any updates thereto. For a query 134 submitted by a user 132 through a user computing device 130, the search engine 128 can quickly perform the search by looking up the generated index 124 and return the search results 136. The search query 134 and the search results 136 can be sent via a network 138, which might be the same as or different from the network 122. In addition, the denormalization engine 106 can also create a query plan for a query 134 based on the normalized data model, and converts the query plan into a plan that utilizes the existing denormalizations to generate a more efficient query.

The search engine 128 can gather the search queries 134 and forward them to the denormalization engine 106 which, in turn, can perform analysis on the received queries 134 to infer denormalization and provide recommendations as to desirable annotations accordingly. Depending on the configuration of the system, the recommended annotation can be automatically added to the corresponding schemas 112 or be added after obtaining approval from the developer/administrator 126. The added annotation can then be utilized to perform denormalization as described above.

It should be noted that while FIG. 1 illustrates one indexing engine 108 and one search engine 128, there can be multiple indexing engines that receive the sub POIs 118 and generate an index 124 that is suitable for their corresponding search engine 128. The indexing engine 108 can be integrated into the search engine 128 or may be separate from the search engine 128 as illustrated in FIG. 1.

It should also be appreciated that while FIG. 1 illustrates the data store 104 as a single data store for storing the data instances 116, the data store 104 can be, and often times is, implemented in a distributed manner in that the data instances 116 are stored in multiple different systems. Likewise, the POI storage 110 can also be implemented in a distributed manner. In addition, while the sub POIs are illustrated in FIG. 1 as being stored separately from the data instances 116, they can be stored along with their corresponding data instances 116.

Figure 2:
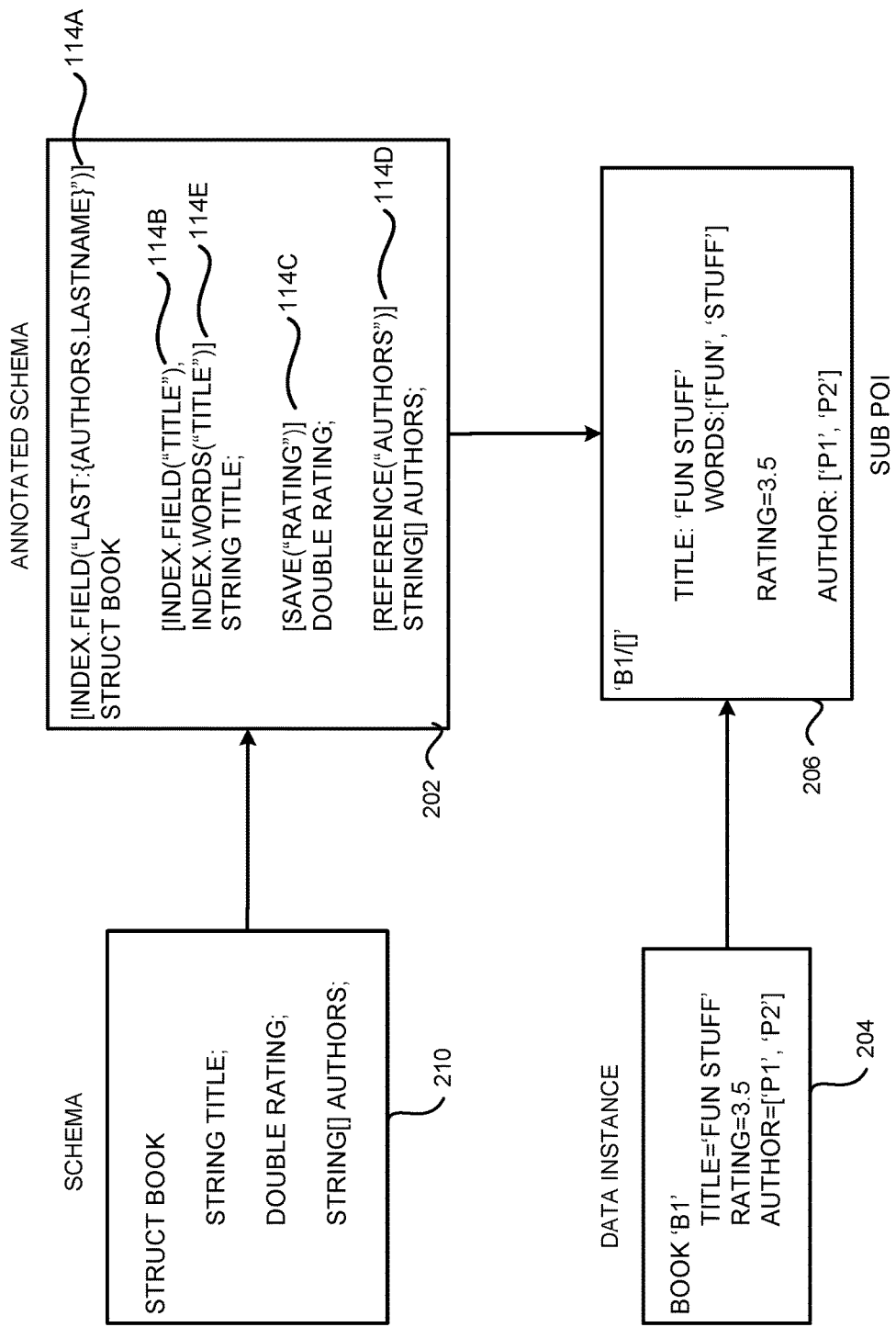
FIG. 2 is a data structure diagram illustrating an example for annotating a schema and processing a data instance based on the annotation to generate a sub POI.

Referring now to FIG. 2, an example for annotating a schema and processing a data instance based on the annotation to generate a sub POI will be described. FIG. 2 shows a schema 210 for a data structure "Book," which contains three elements: "Title," "Rating" and "Authors." The schema 210 can be expressed using any language that is capable of describing a schema including, but not limited to, the BOND schema language from MICROSOFT Corporation of Redmond, Wash., JavaScript object notation ("JSON"), JSON Schema, and Protocol Buffers developed by GOOGLE INC. of Mountain View, Calif.

For denormalization purposes, a schema can be annotated and becomes an annotated schema 112. In this example, the annotated schema 202 is generated by annotating the schema 210. The annotated schema 202 contains an annotation 114A defined on the structure, an annotation 114B and an annotation 114E defined on the field or element "Title," an annotation 114C defined on the field or element "Rating," and an annotation 114D defined on the field or element "Authors." The annotations 114A-114E might be referred to herein collectively as "annotations 114" or individually as "an annotation 114."

Specifically, the annotation 114A indicates that the "LastName" of the data instances referenced by Authors is to be used in indexing the Book data instances with a key of "Last: {Authors.Lastname}." Annotation 114B indicates that Title of the Book data instances should be indexed as a single value and Annotation 114E indicates that individual words in the "Title" element should also be indexed. Annotation 114C indicates that the value of the Rating should be returned or used during ranking. Annotation 114D indicates that Authors are references to other data instances. Depending on the implementation, references can be made in any format, such as a string, a number, a composite key of multiple fields, or any other format that can be utilized to represent a reference.

It should be noted that the annotations 114 are independent of the schema language used by the schema 210. In other words, these annotations 114 can be added to a schema written in any language. Further, the annotations 114 can be included with the schema definition 210 as shown in FIG. 2. The annotations 114 can also be defined via other schemas or through application programming interfaces ("APIs") as standoff annotations.

Based on the annotation 114, the denormalization engine 106 can process Book data instances to generate sub POIs 118. In the example shown in FIG. 2, a new Book instance B1 204 is received at the denormalization engine 106. The instance B1 204 has the Title being "Fun Stuff," the Rating being 3.5, and the Authors containing "p1" and "p2." In this example, the data instance B1 204 is the target data instance for the denormalization indicated in the annotation 114 and the target sub POI 206, denoted as "B1/[ ]," should be generated.

The specific data to be included in the target sub POI 206 can be determined by obtaining instantiation values from the data instance B1 204 based on the annotations 114. Specifically, the denormalization engine 106 can analyze the annotation 114B to determine that the entire value of the Title, which has an instantiation value "Fun Stuff," should be placed in the target sub POI B1/[ ] 206. In addition, the individual words of the Title, i.e. "Fun" and "Stuff," should also be put in the target sub POI B1/[ ] 206. The denormalization engine 106 can further save the Rating value 3.5 in the sub POI B1/[ ] 206 according to the annotation 114C and add "p1" and "p2" as references to source data instances in the sub POI B1/[ ] 206 according to annotation 114D. The generated target sub POI B1/[ ] 206 is shown in FIG. 2.

It should be noted that the technologies described herein do not rely on the source data instances, such as the source data instances referenced by "p1" and "p2," to be exist nor to be immediately processed when processing a data instance 204. In the example shown in FIG. 2, obtaining instantiation values for "Authors:LastName" in the annotation 114A requires data from the source data instances referenced by "p1" and "p2," which can be obtained later when processing the corresponding source data instances. As discussed above, such data can then be included in the corresponding source sub POIs. Details regarding generating source sub POIs will be discussed below with regard to FIGS. 3A, 3B and 4.

Figure 3A:
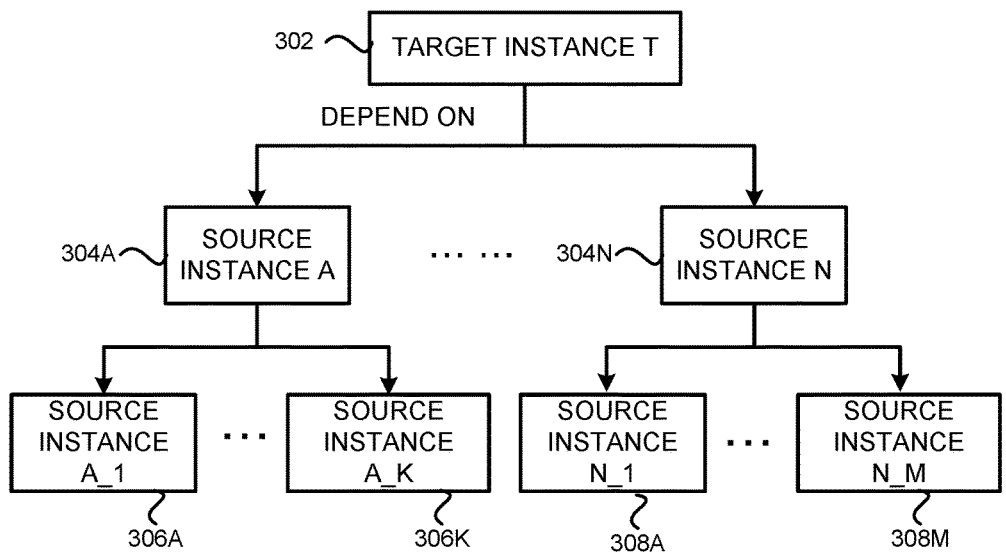
FIGS. 3A and 3B are data structure diagrams illustrating example dependencies between a target data instance and its source data instances, and sub POIs generated for the target data instance to track such dependencies, respectively.
Figure 3B:
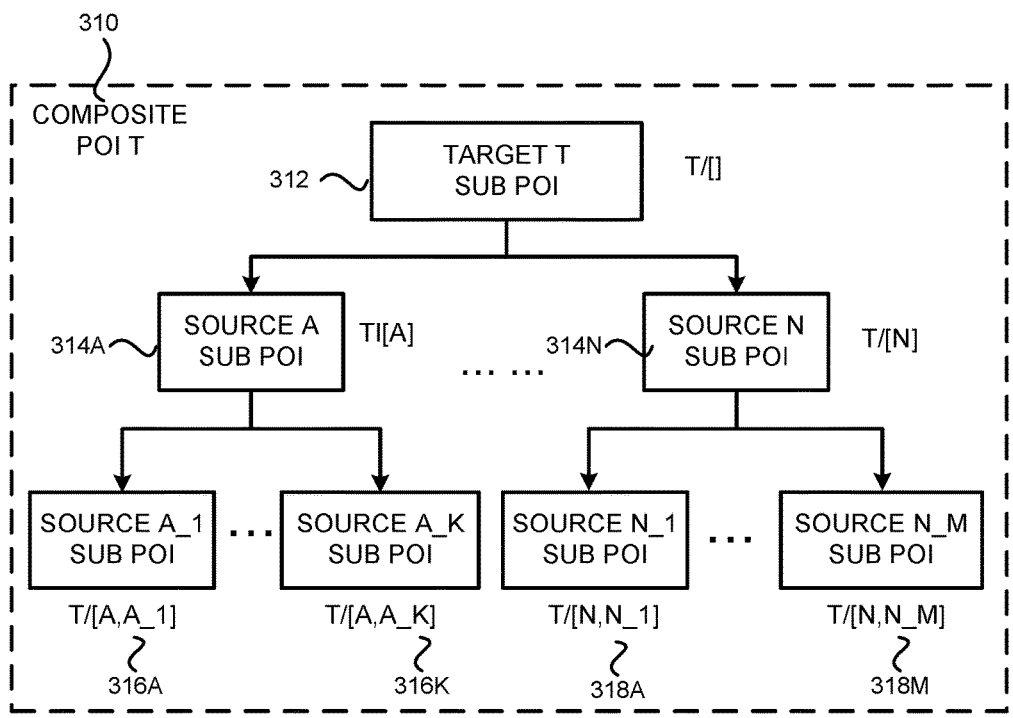

FIG. 3A illustrates example dependencies between a target data instance 116 and its source data instances 116, and FIG. 3B illustrates sub POIs 118 of the target data instance 116 that track the data instance dependencies shown in FIG. 3A. As shown in FIG. 3A, a target data instance T 302 depends on a number of source instances 304A-304N (which might be referred to herein as source instances 304). The source data instances 304 further depend upon other source data instances 306A-306K (which might be referred to herein as source instances 306) and 308A-308M (which might be referred to herein as source instances 308).

During denormalization, the dependency relationship between a target instance 302 and its source data instances 304 can be identified from annotations 114 describing that the denormalization of the target instance T 302 requires data from source data instances 304A-304N. Further dependencies between the source data instances 304 and the source data instances 306 and 308 can be identified similarly through the annotation 114 or be discovered when source instances 304A-304N are being processed.

In order to track the dependencies between the target data instance T 302 and its source data instances 304, 306 and 308, sub POIs created for the target instance T 302 can be structured similarly to reflect the dependencies. As shown in FIG. 3B, a target sub POI 312, denoted as "T/[ ]," can be created for the target data instance 302 and be configured to include only data obtained from the target data instance 302. Then, for each source data instance, a source sub POI can be created to store data obtained from the corresponding source data instance. In this example, a source sub POI 314A, denoted as "T/[A]," is created for the source data instance A 304A, and a source sub POI 314N, denoted as "T/[N]," is created for the source data instance N 304N.

Similarly, a source sub POI 316A, denoted as "T/[A, A_1]," can be generated for the source data instance A_1 306A. Note that the source data instance A_1 306A has a two-layer dependency relationship with the target data instance 302 through the source data instance 304A. Such a dependency path or relationship can be reflected by data contained in the source sub POI 316A, such as through an identification or other element of the sub POI 316A. Such identification data can be utilized later on by the denormalization engine 106 to retrieve the sub POI 316A as being related to the source data instance A 304A in addition to being related to the source data instance A_1 306A. Other sub POIs, such as sub POIs 316K and 318A-318M, can be generated in a similar manner. The target sub POI 312 and the source sub POIs 314A-314N, 316A-316K and 318A-318M constitute a complete POI for the target source 302, which might be referred to herein as a composite POI 310 for the target data instance 302.

Generating the composite POI 310 for a target data instance in the manner described above can make the maintenance of the data denormalization more effective and efficient to ensure data consistency in the system. For instance, the target data instance 302 might be updated to show that it no longer depends on the source data instance A 304A. Such a change can be easily propagated into the denormalization of the target data instance 302 by removing the source sub POIs that are derived from the source data instance 304A, namely, the sub POIs 314A and 316A-316K without affecting the rest of the sub POIs.

Similarly, when there is a change to one of the source data instances, such as the data instance 306K, only the sub POI corresponding to or related to that source data instance, the sub POI 316K in this example, needs to be retrieved and updated by the denormalization engine 106. The denormalization engine 106 would not, and need not, touch other sub POIs.

It should be noted that while FIGS. 3A and 3B illustrate two levels of dependency between a target data instance 116 and a source data instance 116, there can be any number of levels of dependencies between them. Likewise, a target data instance 116 can depend on any number of source data instances 116, which can further depend on any number of additional source data instances 116. In addition, there can be circularities in the dependencies among the data instances 116 and the circularity can loop for a limited number until a fixed point is achieved if the underlying data or dependencies do not change. For example, a circular dependency can exist between data instances D1 and Q1 when building the index for D1 depends on information from Q1 and building the index for Q1 depends on information from D1. When D1 is being processed, a sub POI D1/[Q1] can be generated indicating information needed from Q1. However, it is not known what Q1 needs from D1 until Q1 is processed. When Q1 is being processed, information needed for D1/[Q1] can be obtained. In the meantime, a sub POI Q1/[D1] is created showing the information needed by Q1 from D1. In order to fill in the sub POI Q1/[D1], D1 needs to be processed one more time. It should be noted, however, that because the sub POI D1/[Q1] is complete, Q1 does not need to be processed again. As can be seen from this example, rather than cycling forever, the system is capable of cycling for a limited number of loops until all of the needed information is obtained. It should be further noted that if the values of D1 or Q1 have changed, or the dependencies between them have changed, additional loops would be required to update the value in the corresponding sub POIs.

Figure 4:
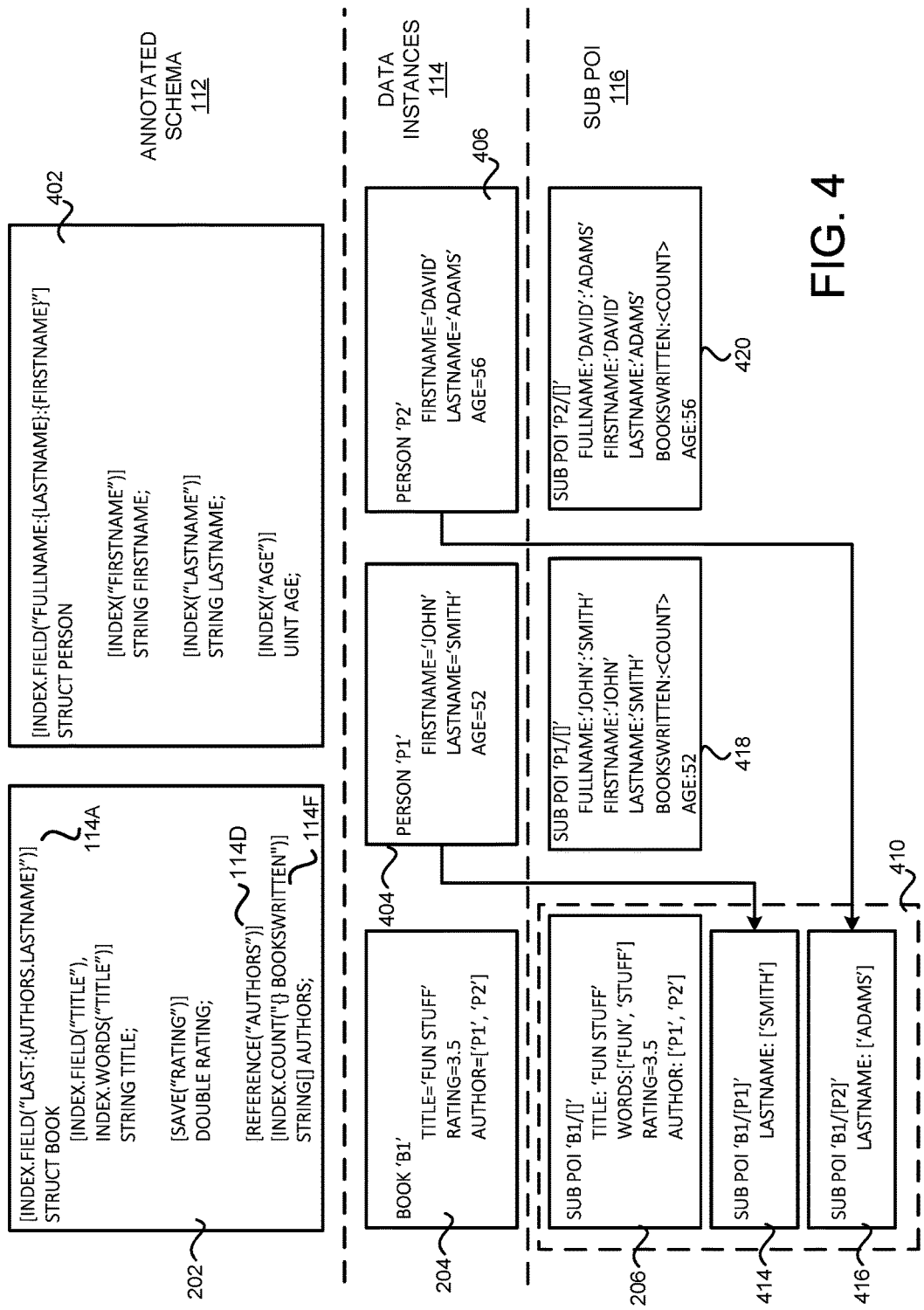
FIG. 4 is a data structure diagram that illustrates an example for generating sub POIs for a target data instance based on the annotation in the annotated schema, data contained in the target data instance, and data contained in its source data instances.

FIG. 4 illustrates an example for generating sub POIs 118 based on the example shown in FIG. 2 with additional data instances 114 and annotated schema 112. As discussed above with regard to FIG. 2, the annotated schema 202 is received at and registered with the denormalization engine 106. The denormalization engine 106 then generates a target sub POI 206 according to the annotation 114 in the annotated schema 202. The annotations 114A and 114D in the annotated schema 202 further indicate that the Authors "p1" and "p2" each refers to a source data instance and the LastName in the corresponding source data instance is to be used in indexing. Based on such an annotation, the denormalization engine 106 can further generate a source sub POI B1/[p1] 414 for p1 and a source sub POI B1/[p2] 416 for p2.

The LastName instantiation values for the source sub POIs 414 and 416 can be obtained when the denormalization engine 106 processes the source instances p1 and p2. When processing a data instance, such as the data instance 204, the denormalization engine 106 can return the references to the source data instances that need to be processed in order to update the corresponding sub POIs, such as p1 and p2. These returned references can be processed immediately or can be put into a queue to be processed later. In one implementation, the denormalization engine 106 immediately starts the processing of p1 and p2 after processing the instance B1 to obtain the LastName values. In another implementation, the denormalization engine 106 can delay the processing of the data instances p1 and p2 by a predetermined period of time, such as a few minutes or a few hours. In yet another implementation, the denormalization engine 106 can place a task for processing the source data instances p1 and p2 into a task queue of the denormalization engine 106. The source data instances p1 and p2 can then be processed by the denormalization engine 106 when they rise to the top of the task queue. The denormalization engine 106 can determine when to process the source data instances p1 and p2 in other manners.

When the denormalization engine 106 starts to process the instance p1 404, the denormalization engine 106 can obtain the instantiation value "Smith" for p1's LastName. Such an instantiation value can then be utilized to populate the source sub POI B1/[p1] 414 for the target instance 204. In addition, the denormalization engine 106 can notify a search indexer, such as the indexing engine 108, that the source sub POI B1/[p1] 414 has changed. Similarly, when the denormalization engine 106 processes the instance p2 406, the denormalization engine 106 can obtain p2's LastName "Adams" and fill in the source sub POI B1/[p2] 416 with the obtained value. The indexing engine 108 can also be notified about the change in the source sub POI B1/[p2]. The target sub POI "B1/[ ]" 206, the source sub POI "B1/[p1]" 414 and the source sub POI "B1/[p2.]" 416 constitute the composite POI 410 for the target data instance 204.

Note that in the example shown in FIG. 4, the schema 402 for the Person instances also contains annotations for denormalization. The annotations in the schema 402 indicate that the Person data instances can be indexed through FirstName, LastName, Age and FullName consisting of LastName and FirstName. Based on these annotations, when processing the data instance p1 404, the denormalization engine 106 can also generate a target sub POI 418 for the data instance p1 404.

Similarly, a target sub POI 420 for the data instance p2 406 can also be generated when the denormalization engine 106 processes the data instance p2 406. Note that since the annotation in the annotated schema 402 does not indicate that a Person data instance depends on other data instances, source sub POIs would not be generated for the data instances p1 and p2. In this case, the composite POIs for the Person data instances p1 and p2 only include the target sub POI 418 and the target sub POI 420, respectively.

The annotated schema 202 shown in FIG. 4 includes an additional annotation 114F [Index.count("{ } BooksWritten")]. This annotation would cause a Person data instance referenced by a Book data instance to have a BooksWritten:<count> entry in the corresponding target sub POI, such as those shown in the sub POI "P1/[ ]" 418 and the sub POI "P2/[ ]" 420 in FIG. 4. When a new Book data instance is received and processed, the BooksWritten:<count> entry in the corresponding sub POI referenced by the Authors of the Book data instance would be increased by one to keep a count of books authored by a certain person. This can be achieved through applying a transform on the corresponding sub POIs. By utilizing the transform mechanism, there is no need to create the sub POIs P1/[B1] and P2/[B1] for the Book data instance B1. In a data store where there are a large number of Book data instances, the transform mechanism can save a significant amount of computational resources by eliminating the need of creating and updating the sub POIs like P1/[B1] for each Book data instance.

It should be appreciated that the data instance denormalization described herein inherently supports forward references, i.e. referencing to a data instance even before it exists in the system. For instance, in the example shown in FIG. 4, the target sub POI 206 can refer to Person instances p1 and p2 before they are created in the data store 104. The source sub POIs corresponding to the non-existent source data instances can be populated with instantiation values at a later time when the source data instances come into existence. Allowing forward references can greatly reduce the computational cost of denormalization and the time spent on denormalization. Without the forward references, the target sub POI cannot be generated until all the source data instances are available, thereby causing delays in completing the denormalization process. In addition, the target data instance might have to be processed multiple times until all of its source data instances are available.

Figure 5:
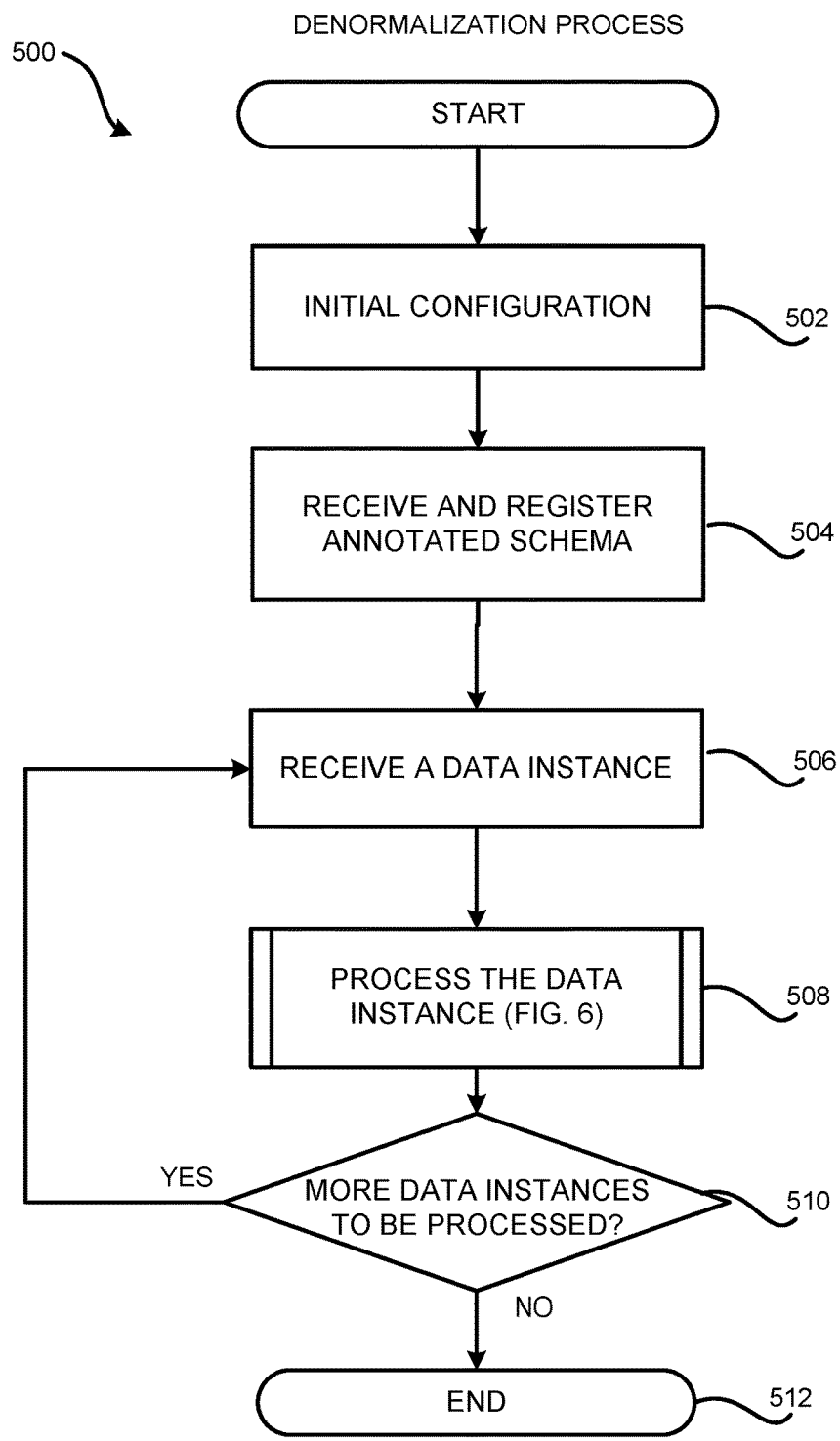
FIG. 5 is a flow diagram showing aspects of one illustrative process for denormalizing data instances.

FIG. 5 is a flow diagram showing aspects of one illustrative routine 500 for denormalizing data instances 116. In some implementations, the routine 500 is performed by the denormalization engine 106 described above in regard to FIG. 1. It should be appreciated, however, that the routine 500 might also be performed by other entities in the denormalization system 100 illustrated in FIG. 1.

It should be further appreciated that the logical operations described herein with respect to FIG. 5 and the other figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein. It also should be understood that each of the illustrated methods can be ended at any time and need not be performed in its entirety.

Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should also be understood that the various software components described herein can be implemented using or in conjunction with binary executable files, dynamically linked libraries ("DLLs"), application programming interfaces ("APIs"), network services, script files, interpreted program code, software containers, object files, bytecode suitable for just-in-time ("JIT") compilation, and/or other types of program code that can be executed by a processor to perform the operations described herein. Other types of software components not specifically mentioned herein can also be utilized.

The routine 500 begins at operation 502 where the denormalization engine 106 performs an initial configuration, such as setting up the POI storage 110. The initial configuration might also include registering libraries or functions that can be utilized to interpret annotations 114, to analyze data instances 116, and/or to generate sub POIs 118. Other operations might be performed during the initial configuration. The routine 500 then proceeds to operation 504, where the denormalization engine 106 receives and registers annotated schemas 112 sent by the developer 126 through the developer computing device 102.

From operation 504, the routine 500 proceeds to operation 506 where the denormalization engine 106 receives a data instance 116. The received data instance 116 might be a new data instance 116 or an update 120 to an existing data instance 116. In the scenario where the received instance is an update 120 to an existing data instance 116, either the changes to that data instance or the updated data instance itself is received at operation 506.

The routine 500 further proceeds to operation 508, where the denormalization engine 106 processes the received data instance 116 or the instance update 120 to generate new sub POIs 118 or update existing sub POIs 118 stored in the POI storage 110. As discussed above, depending on how the denormalization engine 106 is configured, the processing of the data instance 116 might lead to tasks for processing one or more data instances to be put in a task queue for the denormalization engine 106. The details regarding the processing of a data instance will be described below with regard to FIG. 6.

From operation 508, the routine 500 proceeds to operation 510, where the denormalization engine 106 determines whether there are more data instances 116 to be processed, for example, by determining whether there are tasks left in the task queue. If there are more data instances 116 to be processed, the routine 500 proceeds to operation 506. Otherwise, the routine 500 proceeds to operation 512, where it ends.

Figure 6:
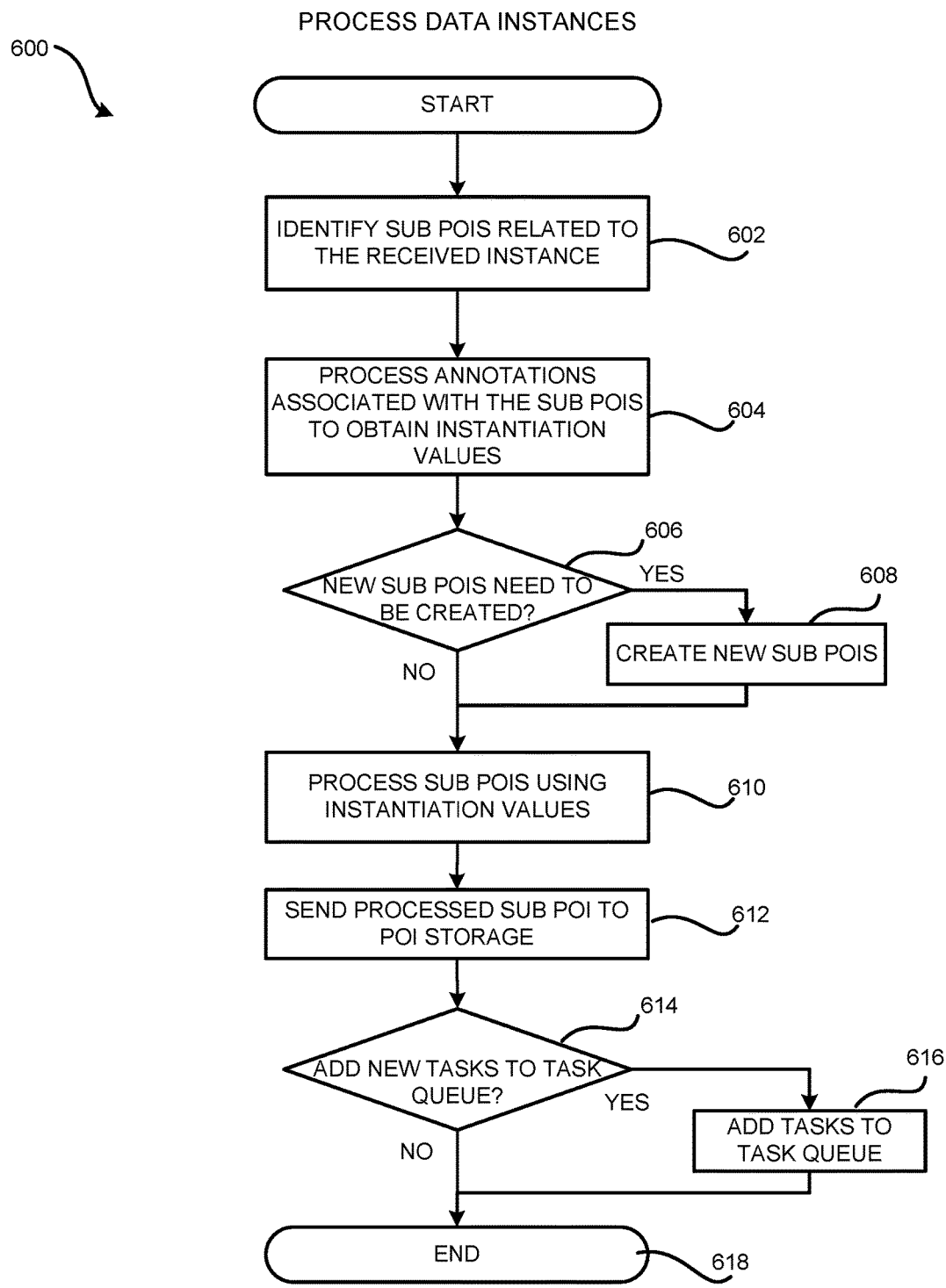
FIG. 6 is a flow diagram showing aspects of one illustrative process for processing a data instance for denormalization.

FIG. 6 is a flow diagram illustrating aspects of one illustrative routine 600 for processing a data instance 116 received at the denormalization engine 106 for denormalization. The routine 600 begins at operation 602 where the denormalization engine 106 identifies all the sub POIs 118 that are related to the received data instance 116 from the POI storage 110. A sub POI 118 can be related to the received data instance 116 if the sub POI belongs to the composite POI for the received data instance 116. In other words, a sub POI is either a target sub POI or a source sub POI of the received data instance 116.

A sub POI 118 can also be related to the received data instance 116 if the received data instance 116 is a source data instance of another target data instance and the sub POI 118 is the corresponding source sub POI. The relationship between the data instance and a sub POI can also be established when the data instance changes the value of data contained in that sub POI. For example, when the data instance is a new data instance representing a new book written by a certain author, a sub POI containing the total number of books written by that author is related to this data instance in that the data instance would cause the total number of books to be increased by one. It should be appreciated that a data instance and a sub POI can be related in other ways.

In the example shown in FIG. 4, if the received data instance 116 is the Person data instance p1 or an update to the instance p1, the identified related sub POIs would include the sub POI p1/[ ] as the target sub POI of p1 itself. The related sub POIs can also include the sub POI B1/[p1] 414 because p1 is the source data instance of Book data instance B1 and the sub POI B1/[p1] 414 is the corresponding source sub POI. In another example, as shown in FIG. 3, if the received data instance is source instance A 304A, the related sub POIs can include all the sub POIs that are derived from the received data instance A 304A, that is, the sub POIs 314A and sub POIs 316A-316K.

From operation 602, the routine 600 proceeds to operation 604 where the denormalization engine 106 can process the annotation 110 associated with each of the identified related sub POIs, i.e. the relevant annotation 114 contained in the annotated schema 112 of the corresponding target data instance 116 that caused the generation of the corresponding sub POI. The data in the received data instance 116 can then be utilized to obtain instantiation values for the relevant annotation 114.

The routine 600 then proceeds to operation 606, where the denormalization engine 106 determines whether new sub POIs need to be generated. For example, the received data instance 116 might be a new data instance and its associated annotation 110 indicates that a target sub POI should be generated for this new data instance. In addition, one or more source sub POIs might be generated if the new data instance depends on other data instances.

In another example where the received data instance is a source data instance, the denormalization engine 106, while obtaining instantiation values from the data instance, discovers that this source data instance further depends on other source data instances. In such a scenario, new source sub POIs need to be created for the other source data instances. For instance, an annotation in a Book schema indicates that the Book data instance should be indexed on its author's children's name. When processing a Person data instance representing the author of a Book instance, the denormalization engine 106 discovers that the author has two children, for which information is stored in two separate Child data instances. In such a scenario, two source sub POIs should be generated, one for each Child data instance.

If it is determined at operation 606 that new sub POIs should be generated, the routine 600 proceeds to operation 608 where the identified new sub POIs are generated. If it is determined at operation 606 that no new sub POIs need to be generated, the routine 600 proceeds to operation 610. At operation 610, the denormalization engine 106 processes the related sub POIs and newly created sub POIs, if there is any, by propagating the instantiation values obtained at operation 604 into those sub POIs.

According to one implementation, the processing at operation 610 can be performed by invoking denormalization operators. A denormalization operator can include software code configured to process the instantiation values into a sub POI. The denormalization engine 106 can have default operators implemented therein. Alternatively, or additionally, the developer/administrator 126 can provide the denormalization engine 106 with customized operators by, for example, implementing the operators as a DLL.

From operation 610, the routine 600 proceeds to operation 612, where the processed sub POIs are sent to the POI storage 110. As briefly described above, the processed sub POIs can include newly created sub POIs 118, a change to an existing sub POI 118, or an indication to delete an existing sub POI 118. The processed sub POIs can also include a transform to an existing sub POI 118. The transform can specify that the existing sub POI be transformed and code that defines a commutative transform to apply to that sub POI. In the previous example, where a sub POI contains data indicating the total number of books written by an author, processing a Book instance representing a new book written by that author would lead to a transform to the sub POI, i.e. increasing the total book number by one. In this case, instead of returning the entire sub POI with the total book number changed, the denormalization engine 106 can return a transform to the POI storage 110. The transform can specify the transform is to be applied on that specific sub POI and the transform is to increase the total number of books by one. The advantage of utilizing a sub POI transform, instead of replacing the entire sub POI with the new value, is that the total book number might have been changed by other processes while the sub POI is being processed by the denormalization engine 106. Applying a transform to that sub POI can, therefore, lead to a more accurate result. Transforms also have the advantage of reducing the burden on the POI storage 110. For example, to count the likes of a web page that 1000 users liked, a single element can be used to keep the count of the likes rather than maintaining 1000 sub POIs in the POI storages 110 for that web page.

Upon receiving the processed sub POIs, which might be the processed sub POIs or updates to the sub POIs, the POI storage 110 can update the POI storage to reflect the changes including, but not limited to, adding new sub POIs to the POI storage 110, removing sub POIs indicated as to be deleted, changing existing sub POIs or applying transforms on the sub POIs. More specifically, for the received processed sub POIs, the POI storage 110 retrieves the relevant sub POIs and apply any applicable transforms on the retrieved sub POIs. The POI storage 110 can also delete sub POIs and/or modify the sub POIs as indicated in the processed sub POIs. It should be noted that the POI storage 110 might be updated based on multiple processed sub POIs received from multiple machines, which can cause conflicts when updating the POI storage. For example, the deletion or modification operation can fail because the version of the corresponding sub POI has changed by another updates to the sub POIs. In that situation, the entire update process might have to be aborted. If further analysis shows that all the operations that failed were transforms, the transform operations can be re-applied to the corresponding sub POIs again. If the failed operations include operations other than transforms, the updating process described above can be start over by fetching corresponding sub POIs again from the POI storage.

From operation 612, the routine 600 proceeds to operation 614, where the denormalization engine 106 determines whether new tasks should be added to the task queue for the denormalization engine 106. As described above, the denormalization engine 106 might be configured to immediately process source data instances after processing the data instance, or delay the process by a predetermined amount of time, or adding a task for processing the source data instances in the task queue of the denormalization engine 106. If it is determined that new tasks should be added to the task queue, the routine 600 proceeds to operation 616 to add the tasks into the task queue. Otherwise, the routine 400 proceeds to operation 618, where it ends.

As illustrated in FIG. 6, the data instances 116 are processed one at a time with the related sub POIs saved and ready to be updated whenever related data instances 116 are processed. By employing such a mechanism, the denormalization system can be flexible as to when updates happen. It also allows the denormalization system to handle forward references as discussed above. In addition, an update to a data instance can be propagated to every denormalization by processing each relevant data instance only once. Further, the denormalization process can incorporate any transforms of the denormalized data, thereby allowing additional denormalization capabilities to be easily added.

It should be appreciated that the denormalization described herein, particularly the dependency tracking through sub POIs, is capable of handling cycles without infinite cascade. For example, suppose that the Person structure in the annotated schema 402 shown in FIG. 4 includes two more elements "string[ ] Children," and "string Parent." Some of the data instances of the annotated schema 402 are:
 p2: Person(FirstName: "David", LastName: "Adams", Age=56, Children: ["Kai4", "Kate5" ]);
 Kai3: Person(FirstName: "Kai, LastName: "Adams", Children: [ ], Parent:"p2")
 Kate4: Person(FirstName: "Kate", LastName: "Adams", Children: [ ], Parent: "p2")

Further suppose that the annotated schema 202 shown in FIG. 4 includes the following annotation:
 [index.field("ParentsOfChildren:{Authors.Children. Parent.FirstName")].

The added annotation would create a cycle in the dependency path: B1→4p2→[Kai3, Kate4]→p2, which would lead to an infinite cascade of items to reprocess unless the cycle is broken. The sub POIs described above would allow the cycle to be broken: when a data instance is processed, the denormalization engine 106 can only add one task of processing an instance to its task queue if there is a sub POI that has not been fully populated with instantiation values. In the above example, the generated sub POIs would include B1/[ ], B1/[p2], B1/[p2, Kai3], and B1/[p2, Kate4].

When the denormalization engine 106 processes data instance Kai3, p2.FirstName would be required in the sub POI B1/[p2, Kai3], which would cause p2 to be reprocessed again by adding a task in the task queue. Similarly when Kate4 is processed, a task for processing p2 would be added to the task queue in order to obtain p2.FirstName for the sub POI B1/[p2, Kate4]. When later p2 is processed the second time, p2.FirstName would be filled into both the sub POI B1/[p2, Kai3] and the sub POI B1/[p2, Kate4]. At this point, no more new tasks will be added to the task queue, and thus no infinite cascade is resulted from the cycle.

It should be further appreciated that the denormalization described herein is declarative rather than being written as code, which has the drawbacks of high update latency and low efficiency. Use of a declarative format also makes the denormalization easier to express and understand, and also allows denormalization to be inferred. The declarative nature of the denormalization also allows the denormalization to be handled automatically and systematically by a denormalization engine rather than individual developers or administrators creating and managing their own denormalizations.

Figure 7:
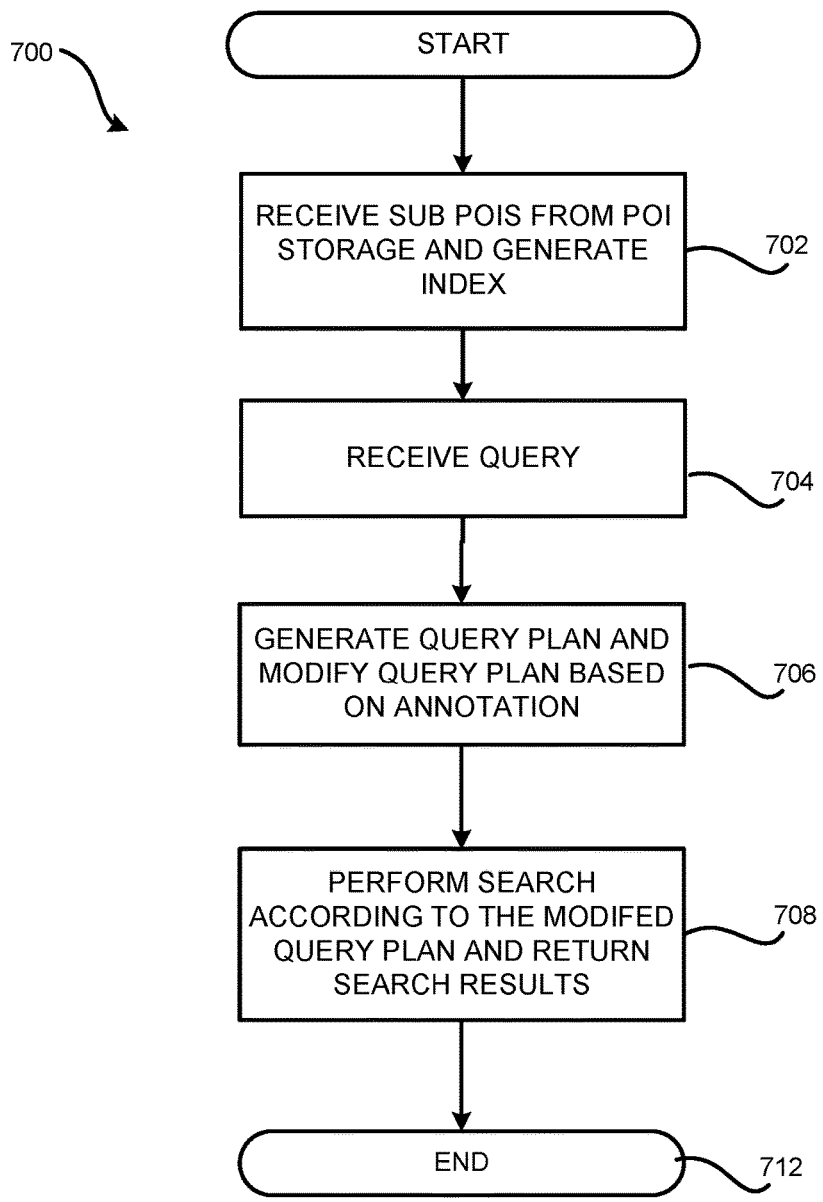
FIG. 7 is a flow diagram showing aspects of one illustrative process for performing a search based on sub POIs generated through data denormalization.

FIG. 7 illustrates a flow diagram showing aspects of one illustrative routine 700 for performing a search based on the sub POIs generated through data denormalization described herein. The routine 700 begins at operation 702, where an indexing engine 108 receives sub POIs from the POI storage 110 and generates an index 124 that is compatible with the search engine 128.

The routine 700 then proceeds to operation 704 where one or more search queries 134 are received from one or more users 132. Note that a query 134 received from the user computing device 132 can be expressed over normalized logical model. In other words, when submitting the query, the user computing device does not need to have any knowledge regarding the denormalization model. This also leads to the advantage that when the denormalization model changes, the queries need not be re-written.

The routine 700 then proceeds to operation 706, where the search engine 128 generates a query plan for the query 134, and further modifies the query plan based on the annotation 114. Since the query 134 is expressed over the normalized logical model without taking into consideration the denormalization model, a query plan generated for such a query would include operations required when searching in normalized data, such as joining multiple tables.

The query plan can be modified by the search engine 128 to take into account the denormalization that has been performed, such as based on the annotation 114. For example, for a given query "Book.Author. LastName=Adams", a search engine 128, without taking into account the denormalization of the Book instances, would include joining the Book table with the Author table in its query plan in order to find out the Author's LastName. Suppose the Book instances have been denormalized to include the LastName of the Authors as shown in FIG. 4. The search engine 128 can then decompose the query into the physical denormalized query and modify the query plan based on the annotation in the annotated schema 202 to only search Book table using the index generated on Author.LastName. It should be noted that the generation of the query plan and the modification of the query plan based on the denomalization can also be performed by the denormalization engine 106.

From operation 706, the routine 700 proceeds to operation 708 where the search engine 128 performs search based on the modified query plan and returns the search results to the user 132. The routine 700 then proceeds to operation 910, where it ends.

It should be appreciated that the search queries 134 received at the search engine 128 can also be sent to the denormalization engine 106 which, in turn, can perform analysis on the received queries 134 to infer or recommend annotations for schemas in the system. For example, if the normalized query Book.Author.Name=<X> appears frequently in the search queries 134, the denormalization engine 106 can recommend an annotation to be added to the Book schema that indicates the Author.Name should be denormalized in the Book data instances and be used for indexing.

A denormalization based on such annotation would allow the query 134 to be searched using the generated index resulting in substantial query latency improvements. Depending on the configuration of the system, the recommended annotation might be automatically added to the corresponding schemas 112 or be added after obtaining approval from the developer/administrator 126. The added annotation can then be utilized to perform denormalization as described above.

Exemplary Schema Annotations

In the following, exemplary schema annotations for denormalization are provided. To annotate a schema, four fundamental indexing annotations can be applied to structures or fields: Index, Save, ID and Reference. Index indicates how to build indices, Save indicates what information should be saved for ranking and ID/Reference defines how the data instances are linked together. The syntax of an indexing annotation is: <Type>[<Template>]. "Type" represents one of Index, Save, ID and Reference. Template, if specified, is the name of a template. Table 1 below shows a list of example indexing annotations.

TABLE 1

| Annotation | Description |
| --- | --- |
| [Index("")] string Title; | Index Title field as a single value. |
| [Index.words("") string Title; | Index the words in the Title field including BM25F ranking information. |
| [Index.field("")] [Index.words("") string Title; | Index Title as both a single value and also the individual words |
| [Index.range("")] int32 Size; | Index Size so that range queries can be performed, i.e. Size >100 && Size <1000. |
| [Save("")] double Rating; | Save Rating so that it can be used when ranking or to return quickly. |

TABLE 1-continued

| Annotation | Description |
| --- | --- |
| [ID("")] uint64 UID; | Mark UID as an identifier that can be used to refer to this structure. |
| [Reference("")] vector<string> Authors; | Mark Authors as a field of references to structures who have string identifiers. |

More complex annotations can also be built based on a number of concepts including Templates, Parameters, Patterns, and Variables. These will be described together with some simple examples.

For a simple annotation like Index.field(" "), "field" is the name of a template. There are a number of built-in templates like "field" in the denormalization engine 106. Developers or administrators 102 can also define their own templates. A template can be understood as a function where parameters can be optionally supplied. The parameters to a template consist of a series of Patterns. Each pattern is a mixture of constants, variables and expressions that when evaluated on a data instance 116 will result in a value, the instantiation value. Depending on the context that value might be a posting ID, a key for another structure or a saved value.

Variables provide a way to have pattern parts that can be used across many templates and that can be explicitly overridden. The variables are evaluated when a pattern is defined rather than when a data instance is being processed. Variables can be defined in terms of other variables. Variables are referred to using $, so for example, there is a built-in variable $Prefix which by default is defined as $Namespace:$Struct. $Namespace and $Struct are defined by the denormalization engine 106 to refer to the current namespace and structure name at the point where an annotation is being processed. Patterns can then put $Prefix wherever they want to define a pattern like a posting ID. If there is an annotation [Variables("Prefix=MyName")] that was in scope (on the current structure one of its base types or the current field), then all of the places $Prefix is used would be MyName: rather than $Namespace:$Struct.

By utilizing Templates, Parameters, Patterns, and Variables, annotations can be constructed to achieve various goals. Table 2 provides a variety of example annotations that can be achieved by the annotating mechanism described above. The annotations shown Table 2 are built for the following schemas.

```
namespace Bonsai.Examples
struct Person
{
    0: uint64 UID;
    10: string PartitionKey;
    20: string FirstName;
    30: string LastName;
}
struct AzureReference
{
    10: string PartitionKey;
    20: uint64 RowKey;
}
struct PersonReference: AzureReference
{
}
struct Discount
{
    0: double Absolute;
    10: double Percentage;
}
struct Book
```

```
{
  0: uint64 UID;
  10: string Title;
  20: vector<PersonReference> Authors;
  30: double Rating;
```

```
  40: uint16 Locale;
  50: vector<string> Keywords;
  60: map<string, Discount> Discounts;
}
```

TABLE 2

| Annotation | Description |
| --- | --- |
| [Index.field("$Prefix:FullName:{ }:{Last Name}")]<br>30: string FirstName; | The field template's first parameter is a pattern for the posting ID. In this case, a composite index is created: Bonsai:Examples:Person:FullName: {First Name}:{LastName} By default { } refers to the value of the current field. |
| [Index.field("FullName:{FirstName}:{Last Name}")]<br>struct Person | This produces the composite index FullName:{FirstName}:{LastName}. This allows fields in different structures to generate the same index entries. |
| [Variables("Case=true; Diacritics=true")]<br>[Index.words("")]<br>10: string Title; | The word template uses a number of variables to control things like case sensitivity. Here the $Case and $Diacritics variables have been overridden so that the words indexed in this field will be case and diacritic sensitive. The scope of these variable bindings is only this field. |
| [Variables("Locale={Locale}")]<br>struct Book | Here the Locale variable has been overridden to dynamically select the word breaker used the "words" template in this particular struct. The variable itself is defined as an expression so that each data instance can dynamically define the locale to use. |
| [ID("Azure:{PartitionKey}:{(string) UID}")]<br>struct Person | This would define a composite ID for a Person that is assembled from a constant (Azure:), a string value from a data instance {PartitionKey) and a 64 bit Bond instance value coerced to a string. {(string) UID}. |
| [Reference ("Azure:{PartitionKey}{(string) RowKey}")]<br>struct AzureReference | This would tell denormalization engine how to construct a reference Azure:{PartitionKey}:{(string) RowKey} from an AzureReference structure. In this case, the value of the destination must be resolved at runtime. |
| [Reference("Azure:{PartitionKey}{(string) RowKey} personRef Bonsai.Examples.Person")]<br>struct PersonReference | This would tell the denormalization engine how to construct a reference ID and also that the reference points to a Person struct. |
| [Index.field("$Prefix:AuthorLast:{Authors.LastName}")]<br>20: vector<PersonReference> Authors; | Given the previous annotation, the denormalization engine knows that Authors are references to People. In this case the path goes through the reference and denormalizes the authors LastName into the index for a book. Since this is a vector there will be one index entry for each author's last name. If there were duplicates, they would be collapsed. |
| [Index.field("$Prefix:Author:{Authors[ ]}:{Authors.LastName}")]<br>20: vector<PersonReference> Authors; | Since Authors is a vector, Bonsai must process each element of the vector. {Authors[ ]} will be filled in with the index used to access each reference. This annotation then will produce Post IDs of the form Bonsai:Examples:Book:Author<index of each author in vector>:<authors last name reached through following reference> |

TABLE 2-continued

| Annotation | Description |
| --- | --- |
| [Index.field("Titles:{ } {Authors}")]<br>10: string Title; | Build a Title:<title person wrote> index for the authors of a book. Matching on this index would give the people, i.e. the authors rather than the books. |
| [Index.container("TitleOrKeyword $Prefix:Title $Prefix:Keywords")]<br>Struct Book | Create an index that incorporates two other indices, i.e. the indices for title and for keywords. This allows querying a single index to cover both fields. |
| [Index.field("$Prefix:{FirstName}")]<br>[Index.field.1("$prefix:{LastName}")]<br>[Index.field.2("$Prefix:{FirstName}:{LastName}")]<br>Struct Person | Index FirstName and LastName as individual fields and as a composite field. |

Figure 8:
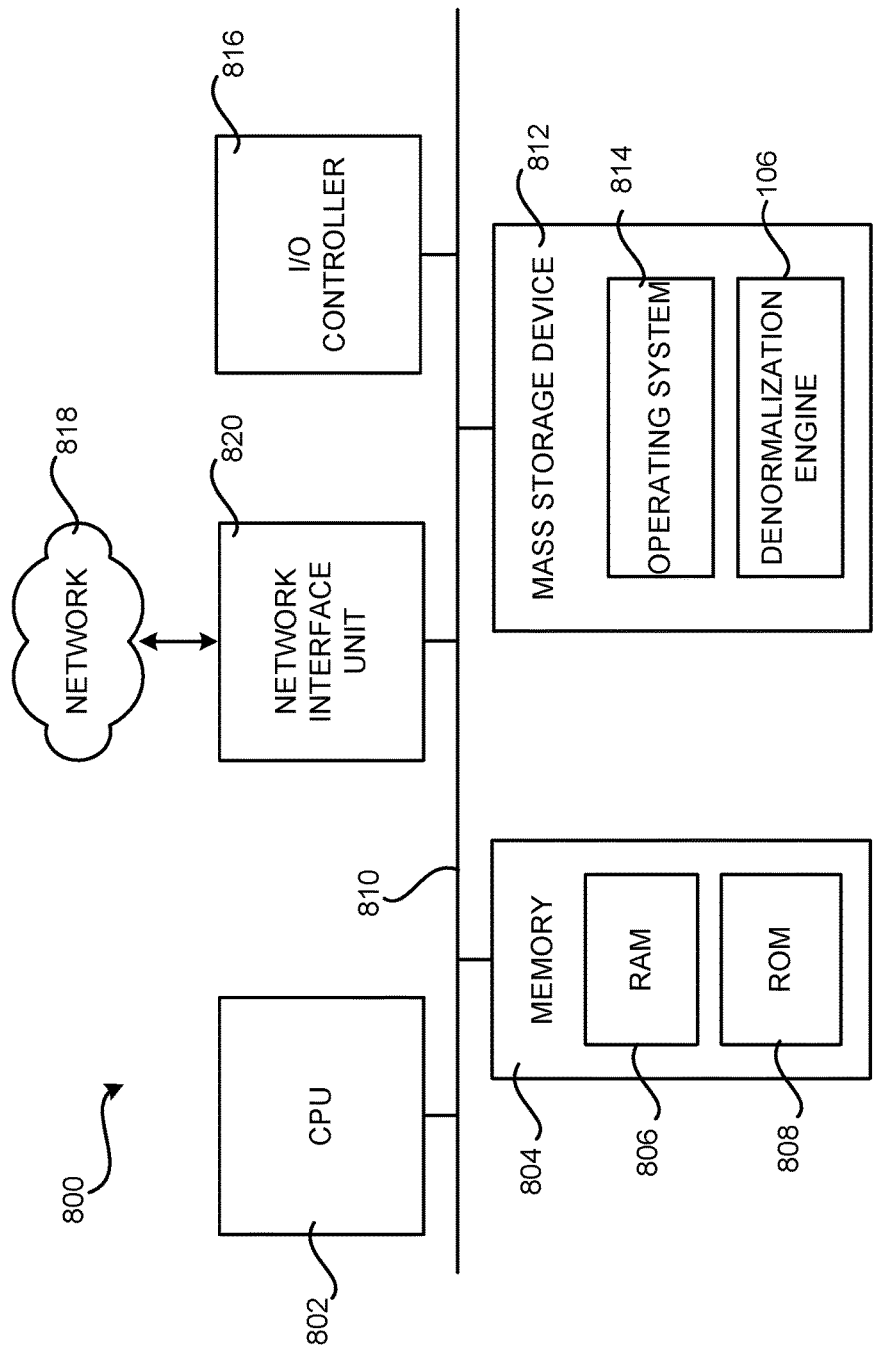
FIG. 8 is a computer architecture diagram showing an illustrative computer hardware and software architecture for a computing system that is capable of implementing aspects of the technologies presented herein.

FIG. 8 is a computer architecture diagram that shows an architecture for a computer 800 capable of executing the software components described herein. The architecture illustrated in FIG. 8 is an architecture for a server computer, mobile phone, e-reader, smart phone, desktop computer, netbook computer, tablet computer, laptop computer, or another type of computing device suitable for executing the software components presented herein.

In this regard, it should be appreciated that the computer 800 shown in FIG. 8 can be utilized to implement a computing device capable of executing any of the software components presented herein. For example, and without limitation, the computing architecture described with reference to the computer 800 can be utilized to implement the computing device executing the denormalization engine 106 shown in FIG. 1 and/or to implement other types of computing systems for executing any of the other software components described above.

The computer 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer 800, such as during startup, is stored in the ROM 808. The computer 800 further includes a mass storage device 812 for storing an operating system 814 and one or more programs including, but not limited to the denormalization engine 106. The mass storage device 812 can also be configured to store other types of programs and data not specifically shown in FIG. 8.

The mass storage device 812 is connected to the CPU 802 through a mass storage controller (not shown) connected to the bus 810. The mass storage device 812 and its associated computer readable media provide non-volatile storage for the computer 800. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 800. For purposes of the claims, the phrase "computer storage medium," and variations thereof, does not include waves or signals per se or communication media.

According to various configurations, the computer 800 can operate in a networked environment using logical connections to remote computers through a network such as the network 818. The computer 800 can connect to the network 818 through a network interface unit 820 connected to the bus 810. It should be appreciated that the network interface unit 820 can also be utilized to connect to other types of networks and remote computer systems. The computer 800 can also include an input/output controller 816 for receiving and processing input from a number of other devices, including a keyboard, mouse, touch input, or electronic stylus (not shown in FIG. 8). Similarly, the input/output controller 816 can provide output to a display screen, a printer, or other type of output device (also not shown in FIG. 8).

It should be appreciated that the software components described herein, such as the denormalization engine 106 can, when loaded into the CPU 802 and executed, transform the CPU 802 and the overall computer 800 from a general-purpose computing system into a special-purpose computing system customized to provide the functionality presented herein. The CPU 802 can be constructed from any number of transistors or other discrete circuit elements, which can individually or collectively assume any number of states. More specifically, the CPU 802 can operate as a finite-state machine, in response to executable instructions contained within the software modules disclosed herein, such as the denormalization engine 106. These computer-executable instructions can transform the CPU 802 by specifying how the CPU 802 transitions between states, thereby transforming the transistors or other discrete hardware elements constituting the CPU 802.

Encoding the software modules presented herein, such as the denormalization engine 106, can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software components presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 800 in order to store and execute the software components presented herein. It should also be appreciated that the architecture shown in FIG. 8 for the computer 800, or a similar architecture, can be utilized to implement other types of computing devices, including hand-held computers, embedded computer systems, mobile devices such as smartphones and tablets, and other types of computing devices known to those skilled in the art. It is also contemplated that the computer 800 might not include all of the components shown in FIG. 8, can include other components that are not explicitly shown in FIG. 8, or can utilize an architecture completely different than that shown in FIG. 8.

Figure 9:
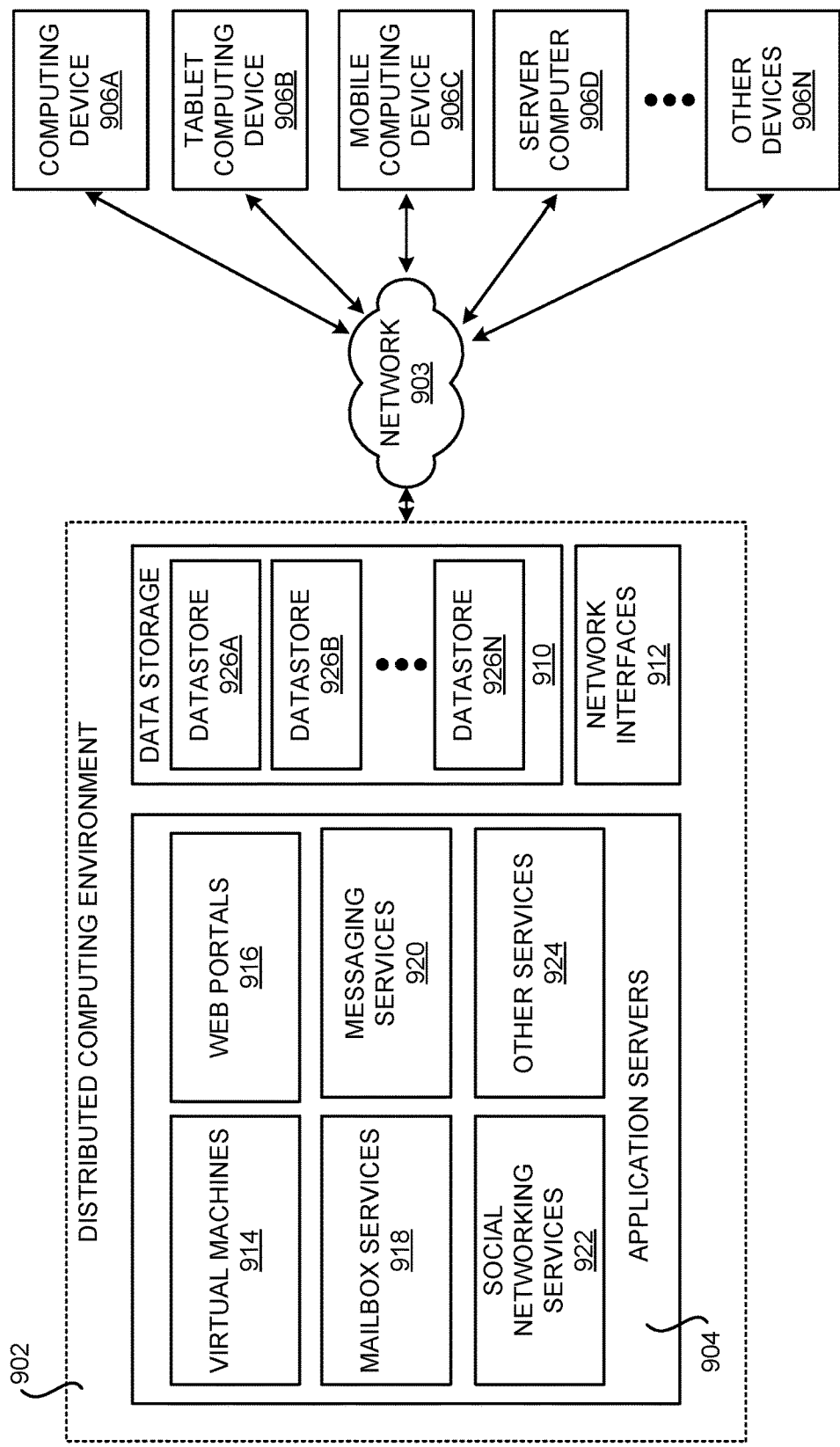
FIG. 9 is a computer system architecture and network diagram illustrating a distributed computing environment capable of implementing aspects of the technologies presented herein.

FIG. 9 shows aspects of an illustrative distributed computing environment 902 in which the software components described herein can be executed. Thus, the distributed computing environment 902 illustrated in FIG. 9 can be used to execute program code, such as the denormalization engine 106, capable of providing the functionality described herein with respect to FIGS. 1-7, and/or any of the other software components described herein. For example, and without limitation, the distributed computing environment 902 can be utilized to implement the functionality provided by the denormalization engine 106 or a network accessible program or service that provides the functionality disclosed herein.

According to various implementations, the distributed computing environment 902 operates on, in communication with, or as part of a network 903. One or more client devices 906A-906N (hereinafter referred to collectively and/or generically as "clients 906") can communicate with the distributed computing environment 902 via the network 903 and/or other connections (not illustrated in FIG. 9).

In the illustrated configuration, the clients 906 include: a computing device 906A such as a laptop computer, a desktop computer, or other computing device; a "slate" or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the distributed computing environment 902. Two example computing architectures for the clients 906 are illustrated and described herein with reference to FIGS. 8 and 10. It should be understood that the illustrated clients 906 and computing architectures illustrated and described herein are illustrative, and should not be construed as being limited in any way.

In the illustrated configuration, the distributed computing environment 902 includes application servers 904, data storage 910, and one or more network interfaces 912. According to various implementations, the functionality of the application servers 904 can be provided by one or more server computers that are executing as part of, or in communication with, the network 903. The application servers 904 can host various services, virtual machines, portals, and/or other resources. In the illustrated configuration, the application servers 904 host one or more virtual machines 914 for hosting applications or network services, such as the denormalization engine 106 or other types of applications and/or services. According to various implementations, the virtual machines 914 host one or more applications and/or software modules, such as the denormalization engine 106. It should be understood that this configuration is illustrative, and should not be construed as being limiting in any way. The application servers 904 might also host or provide access to one or more Web portals, link pages, Web sites, and/or other information ("Web portals") 916.

According to various implementations, the application servers 904 also include one or more mailbox services 918 and one or more messaging services 920. The mailbox services 918 can include electronic mail ("email") services. The mailbox services 918 can also include various personal information management ("PIM") services including, but not limited to, calendar services, contact management services, collaboration services, and/or other services. The messaging services 920 can include, but are not limited to, instant messaging ("IM") services, chat services, forum services, and/or other communication services.

The application servers 904 can also include one or more social networking services 922. The social networking services 922 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 922 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 922 are provided by other services, sites, and/or providers that might be referred to as "social networking providers." For example, some Web sites allow users to interact with one another via email, chat services, and/or other means during various activities and/or contexts such as reading published articles, commenting on goods or services, publishing, collaboration, gaming, and the like. Other services are possible and are contemplated.

The social networking services 922 can also include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 922 are not mentioned herein for the sake of brevity. As such, the configurations described above are illustrative, and should not be construed as being limited in any way.

As also shown in FIG. 9, the application servers 904 can also host other services, applications, portals, and/or other resources ("other services") 924. It can therefore be appreciated that the distributed computing environment 902 can provide integration of the technologies disclosed herein with various mailbox, messaging, social networking, productivity, conversion, and/or other types of services or resources.

As mentioned above, the distributed computing environment 902 can include data storage 910. According to various implementations, the functionality of the data storage 910 is provided by one or more databases operating on, or in communication with, the network 903. The functionality of the data storage 910 can also be provided by one or more server computers configured to host data for the distributed computing environment 902. The data storage 910 can include, host, or provide one or more real or virtual datastores 926A-926N (hereinafter referred to collectively and/or generically as "datastores 926"). The datastores 926 are configured to host data used or created by the application servers 904 and/or other data.

The distributed computing environment 902 can communicate with, or be accessed by, the network interfaces 912. The network interfaces 912 can include various types of network hardware and software for supporting communications between two or more computing devices including, but not limited to, the clients 906 and the application servers 904. It should be appreciated that the network interfaces 912 can also be utilized to connect to other types of networks and/or computer systems.

It should be understood that the distributed computing environment 902 described herein can implement any aspects of the software elements described herein with any number of virtual computing resources and/or other distributed computing functionality that can be configured to execute any aspects of the software components disclosed herein. According to various implementations of the technologies disclosed herein, the distributed computing environment 902 provides some or all of the software functionality described herein as a service to the clients 906. It should be understood that the clients 906 can also include real or virtual machines including, but not limited to, server computers, Web servers, personal computers, mobile computing devices, smart phones, and/or other devices. As such, various implementations of the technologies disclosed herein enable any device configured to access the distributed computing environment 902 to utilize the functionality described herein.

Figure 10:
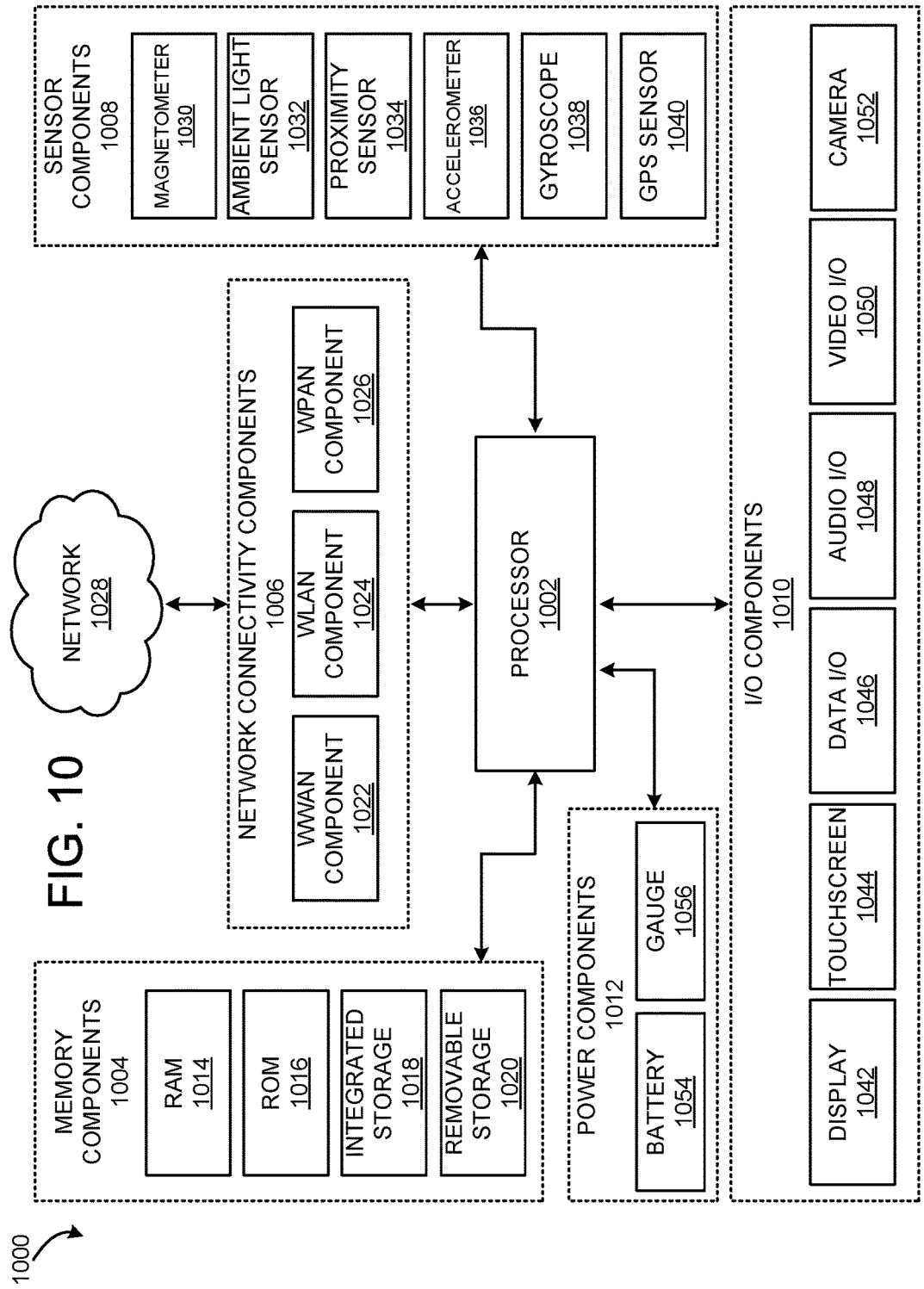
FIG. 10 is a computer architecture diagram illustrating a computing device architecture for another computing device that is capable of implementing aspects of the technologies presented herein.

Turning now to FIG. 10, an illustrative computing device architecture 1000 will be described for a computing device that is capable of executing the various software components described herein. The computing device architecture 1000 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 1000 is also applicable to any of the clients 906 shown in FIG. 9. Furthermore, aspects of the computing device architecture 1000 are applicable to traditional desktop computers, portable computers (e.g., laptops, notebooks, ultra-portables, and netbooks), server computers, and other computer systems, such as those described herein with reference to FIG. 10. For example, the single touch and multi-touch aspects disclosed herein below can be applied to desktop computers that utilize a touchscreen or some other touch-enabled device, such as a touch-enabled track pad or touch-enabled mouse. The computing device architecture 1000 can also be utilized to implement the computing device for executing the denormalization engine 106, and/or other types of computing devices for implementing or consuming the functionality described herein.

The computing device architecture 1000 illustrated in FIG. 10 includes a processor 1002, memory components 1004, network connectivity components 1006, sensor components 1008, input/output components 1010, and power components 1012. In the illustrated configuration, the processor 1002 is in communication with the memory components 1004, the network connectivity components 1006, the sensor components 1008, the input/output ("I/O") components 1010, and the power components 1012. Although no connections are shown between the individual components illustrated in FIG. 10, the components can be connected electrically in order to interact and carry out device functions. In some configurations, the components are arranged so as to communicate via one or more busses (not shown).

The processor 1002 includes one or more central processing unit ("CPU") cores configured to process data, execute computer-executable instructions of one or more application programs, such as the denormalization engine 106, and to communicate with other components of the computing device architecture 1000 in order to perform aspects of the functionality described herein. The processor 1002 can be utilized to execute aspects of the software components presented herein and, particularly, those that utilize, at least in part, a touch-enabled input.

In some configurations, the processor 1002 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, 4K, and greater), video games, 3D modeling applications, and the like. In some configurations, the processor 1002 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 1002 is, or is included in, a system-on-chip ("SoC") along with one or more of the other components described herein below. For example, the SoC can include the processor 1002, a GPU, one or more of the network connectivity components 1006, and one or more of the sensor components 1008. In some configurations, the processor 1002 is fabricated, in part, utilizing a package-on-package ("PoP") integrated circuit packaging technique. Moreover, the processor 1002 can be a single core or multi-core processor.

The processor 1002 can be created in accordance with an ARM architecture, available for license from ARM HOLDINGS of Cambridge, United Kingdom. Alternatively, the processor 1002 can be created in accordance with an x86 architecture, such as is available from INTEL CORPORATION of Mountain View, Calif. and others. In some configurations, the processor 1002 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1004 include a RAM 1014, a ROM 1016, an integrated storage memory ("integrated storage") 1018, and a removable storage memory ("removable storage") 1020. In some configurations, the RAM 1014 or a portion thereof, the ROM 1016 or a portion thereof, and/or some combination of the RAM 1014 and the ROM 1016 is integrated in the processor 1002. In some configurations, the ROM 1016 is configured to store a firmware, an operating system or a portion thereof (e.g., operating system kernel), and/or a bootloader to load an operating system kernel from the integrated storage 1018 or the removable storage 1020.

The integrated storage 1018 can include a solid-state memory, a hard disk, or a combination of solid-state memory and a hard disk. The integrated storage 1018 can be soldered or otherwise connected to a logic board upon which the processor 1002 and other components described herein might also be connected. As such, the integrated storage 1018 is integrated into the computing device. The integrated storage 1018 can be configured to store an operating system or portions thereof, application programs, data, and other software components described herein.

The removable storage 1020 can include a solid-state memory, a hard disk, or a combination of solid-state memory and a hard disk. In some configurations, the removable storage 1020 is provided in lieu of the integrated storage 1018. In other configurations, the removable storage 1020 is provided as additional optional storage. In some configurations, the removable storage 1020 is logically combined with the integrated storage 1018 such that the total available storage is made available and shown to a user as a total combined capacity of the integrated storage 1018 and the removable storage 1020.

The removable storage 1020 is configured to be inserted into a removable storage memory slot (not shown) or other mechanism by which the removable storage 1020 is inserted and secured to facilitate a connection over which the removable storage 1020 can communicate with other components of the computing device, such as the processor 1002. The removable storage 1020 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1004 can store an operating system. According to various configurations, the operating system includes, but is not limited to, the WINDOWS MOBILE OS, the WINDOWS PHONE OS, or the WINDOWS OS from MICROSOFT CORPORATION, BLACKBERRY OS from RESEARCH IN MOTION, LTD. of Waterloo, Ontario, Canada, IOS from APPLE INC. of Cupertino, Calif., and ANDROID OS from GOOGLE, INC. of Mountain View, Calif. Other operating systems can also be utilized in other configurations.

The network connectivity components 1006 include a wireless wide area network component ("WWAN component") 1022, a wireless local area network component ("WLAN component") 1024, and a wireless personal area network component ("WPAN component") 1026. The network connectivity components 1006 facilitate communications to and from a network 1028, which can be a WWAN, a WLAN, or a WPAN. Although a single network 1028 is illustrated, the network connectivity components 1006 can facilitate simultaneous communication with multiple networks. For example, the network connectivity components 1006 can facilitate simultaneous communications with multiple networks via one or more of a WWAN, a WLAN, or a WPAN.

The network 1028 can be a WWAN, such as a mobile telecommunications network utilizing one or more mobile telecommunications technologies to provide voice and/or data services to a computing device utilizing the computing device architecture 1000 via the WWAN component 1022. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 1028 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1028 can be configured to provide voice and/or data communications with any combination of the above technologies. The network 1028 can be configured or adapted to provide voice and/or data communications in accordance with future generation technologies.

In some configurations, the WWAN component 1022 is configured to provide dual-multi-mode connectivity to the network 1028. For example, the WWAN component 1022 can be configured to provide connectivity to the network 1028, wherein the network 1028 provides service via GSM and UMTS technologies, or via some other combination of technologies. Alternatively, multiple WWAN components 1022 can be utilized to perform such functionality, and/or provide additional functionality to support other non-compatible technologies (i.e., incapable of being supported by a single WWAN component). The WWAN component 1022 can facilitate similar connectivity to multiple networks (e.g., a UMTS network and an LTE network).

The network 1028 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1024 is configured to connect to the network 1028 via the WI-FI access points. Such connections can be secured via various encryption technologies including, but not limited to, WI-FI Protected Access ("WPA"), WPA2, Wired Equivalent Privacy ("WEP"), and the like.

The network 1028 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1026 is configured to facilitate communications with other devices, such as peripherals, computers, or other computing devices via the WPAN.

The sensor components 1008 include a magnetometer 1030, an ambient light sensor 1032, a proximity sensor 1034, an accelerometer 1036, a gyroscope 1038, and a Global Positioning System sensor ("GPS sensor") 1040. It is contemplated that other sensors, such as, but not limited to, temperature sensors or shock detection sensors, might also be incorporated in the computing device architecture 1000.

The magnetometer 1030 is configured to measure the strength and direction of a magnetic field. In some configurations the magnetometer 1030 provides measurements to a compass application program stored within one of the memory components 1004 in order to provide a user with accurate directions in a frame of reference including the cardinal directions, north, south, east, and west. Similar measurements can be provided to a navigation application program that includes a compass component. Other uses of measurements obtained by the magnetometer 1030 are contemplated.

The ambient light sensor 1032 is configured to measure ambient light. In some configurations, the ambient light sensor 1032 provides measurements to an application program, such as the application 304, stored within one of the memory components 1004 in order to automatically adjust the brightness of a display (described below) to compensate for low light and bright light environments. Other uses of measurements obtained by the ambient light sensor 1032 are contemplated.

The proximity sensor 1034 is configured to detect the presence of an object or thing in proximity to the computing device without direct contact. In some configurations, the proximity sensor 1034 detects the presence of a user's body (e.g., the user's face) and provides this information to an application program stored within one of the memory components 1004 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 1034 are contemplated.

The accelerometer 1036 is configured to measure proper acceleration. In some configurations, output from the accelerometer 1036 is used by an application program as an input mechanism to control some functionality of the application program. In some configurations, output from the accelerometer 1036 is provided to an application program for use in switching between landscape and portrait modes, calculating coordinate acceleration, or detecting a fall. Other uses of the accelerometer 1036 are contemplated.

The gyroscope 1038 is configured to measure and maintain orientation. In some configurations, output from the gyroscope 1038 is used by an application program as an input mechanism to control some functionality of the application program. For example, the gyroscope 1038 can be used for accurate recognition of movement within a 3D environment of a video game application or some other application. In some configurations, an application program utilizes output from the gyroscope 1038 and the accelerometer 1036 to enhance control of some functionality of the application 304. Other uses of the gyroscope 1038 are contemplated.

The GPS sensor 1040 is configured to receive signals from GPS satellites for use in calculating a location. The location calculated by the GPS sensor 1040 can be used by any application program that requires or benefits from location information. For example, the location calculated by the GPS sensor 1040 can be used with a navigation application program to provide directions from the location to a destination or directions from the destination to the location. Moreover, the GPS sensor 1040 can be used to provide location information to an external location-based service, such as E911 service. The GPS sensor 1040 can obtain location information generated via WI-FI, WIMAX, and/or cellular triangulation techniques utilizing one or more of the network connectivity components 1006 to aid the GPS sensor 1040 in obtaining a location fix. The GPS sensor 1040 can also be used in Assisted GPS ("A-GP S") systems.

The I/O components 1010 include a display 1042, a touchscreen 1044, a data I/O interface component ("data I/O") 1046, an audio I/O interface component ("audio I/O") 1048, a video I/O interface component ("video I/O") 1050, and a camera 1052. In some configurations, the display 1042 and the touchscreen 1044 are combined. In some configurations two or more of the data I/O component 1046, the audio I/O component 1048, and the video I/O component 1050 are combined. The I/O components 1010 can include discrete processors configured to support the various interfaces described below, or might include processing functionality built-in to the processor 1002.

The display 1042 is an output device configured to present information in a visual form. In particular, the display 1042 can present GUI elements, text, images, video, notifications, virtual buttons, virtual keyboards, messaging data, Internet content, device status, time, date, calendar data, preferences, map information, location information, and any other information that is capable of being presented in a visual form. In some configurations, the display 1042 is a liquid crystal display ("LCD") utilizing any active or passive matrix technology and any backlighting technology, if used. In some configurations, the display 1042 is an organic light emitting diode ("OLED") display. Other display types are contemplated.

The touchscreen 1044 is an input device configured to detect the presence and location of a touch. The touchscreen 1044 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 1044 is incorporated on top of the display 1042 as a transparent layer to enable a user to use one or more touches to interact with objects or other information presented on the display 1042. In other configurations, the touchscreen 1044 is a touch pad incorporated on a surface of the computing device that does not include the display 1042. For example, the computing device can have a touchscreen incorporated on top of the display 1042 and a touch pad on a surface opposite the display 1042.

In some configurations, the touchscreen 1044 is a single-touch touchscreen. In other configurations, the touchscreen 1044 is a multi-touch touchscreen. In some configurations, the touchscreen 1044 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 1044. As such, a developer can create gestures that are specific to a particular application program.

In some configurations, the touchscreen 1044 supports a tap gesture in which a user taps the touchscreen 1044 once on an item presented on the display 1042. The tap gesture can be used for various reasons including, but not limited to, opening or launching whatever the user taps, such as a graphical icon representing the application 304. In some configurations, the touchscreen 1044 supports a double tap gesture in which a user taps the touchscreen 1044 twice on an item presented on the display 1042. The double tap gesture can be used for various reasons including, but not limited to, zooming in or zooming out in stages. In some configurations, the touchscreen 1044 supports a tap and hold gesture in which a user taps the touchscreen 1044 and maintains contact for at least a pre-defined time. The tap and hold gesture can be used for various reasons including, but not limited to, opening a context-specific menu.

In some configurations, the touchscreen 1044 supports a pan gesture in which a user places a finger on the touchscreen 1044 and maintains contact with the touchscreen 1044 while moving the finger on the touchscreen 1044. The pan gesture can be used for various reasons including, but not limited to, moving through screens, images, or menus at a controlled rate. Multiple finger pan gestures are also contemplated. In some configurations, the touchscreen 1044 supports a flick gesture in which a user swipes a finger in the direction the user wants the screen to move. The flick gesture can be used for various reasons including, but not limited to, scrolling horizontally or vertically through menus or pages. In some configurations, the touchscreen 1044 supports a pinch and stretch gesture in which a user makes a pinching motion with two fingers (e.g., thumb and forefinger) on the touchscreen 1044 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 1044. As such, the above gestures should be understood as being illustrative and should not be construed as being limiting in any way.

The data I/O interface component 1046 is configured to facilitate input of data to the computing device and output of data from the computing device. In some configurations, the data I/O interface component 1046 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 1048 is configured to provide audio input and/or output capabilities to the computing device. In some configurations, the audio I/O interface component 1046 includes a microphone configured to collect audio signals. In some configurations, the audio I/O interface component 1048 includes a headphone jack configured to provide connectivity for headphones or other external speakers. In some configurations, the audio interface component 1048 includes a speaker for the output of audio signals. In some configurations, the audio I/O interface component 1048 includes an optical audio cable out.

The video I/O interface component 1050 is configured to provide video input and/or output capabilities to the computing device. In some configurations, the video I/O interface component 1050 includes a video connector configured to receive video as input from another device (e.g., a video media player such as a DVD or BLU-RAY player) or send video as output to another device (e.g., a monitor, a television, or some other external display). In some configurations, the video I/O interface component 1050 includes a High-Definition Multimedia Interface ("HDMI"), mini-HDMI, micro-HDMI, DisplayPort, or proprietary connector to input/output video content. In some configurations, the video I/O interface component 1050 or portions thereof is combined with the audio I/O interface component 1048 or portions thereof.

The camera 1052 can be configured to capture still images and/or video. The camera 1052 can utilize a charge coupled device ("CCD") or a complementary metal oxide semiconductor ("CMOS") image sensor to capture images. In some configurations, the camera 1052 includes a flash to aid in taking pictures in low-light environments. Settings for the camera 1052 can be implemented as hardware or software buttons.

Although not illustrated, one or more hardware buttons can also be included in the computing device architecture 1000. The hardware buttons can be used for controlling some operational aspect of the computing device. The hardware buttons can be dedicated buttons or multi-use buttons. The hardware buttons can be mechanical or sensor-based.

The illustrated power components 1012 include one or more batteries 1054, which can be connected to a battery gauge 1056. The batteries 1054 can be rechargeable or disposable. Rechargeable battery types include, but are not limited to, lithium polymer, lithium ion, nickel cadmium, and nickel metal hydride. Each of the batteries 1054 can be made of one or more cells.

The battery gauge 1056 can be configured to measure battery parameters such as current, voltage, and temperature. In some configurations, the battery gauge 1056 is configured to measure the effect of a battery's discharge rate, temperature, age and other factors to predict remaining life within a certain percentage of error. In some configurations, the battery gauge 1056 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 1012 can also include a power connector (not shown), which can be combined with one or more of the aforementioned I/O components 1010. The power components 1012 can interface with an external power system or charging equipment via a power I/O component. Other configurations can also be utilized.

The disclosure presented herein can be considered to encompass the subject matter set forth in the following clauses.

Clause 1: A computer-implemented method for denormalizing data instances, the method comprising: receiving an annotated schema comprising an annotation for denormalizing data instances of the annotated schema; processing a data instance of the annotated schema according to the annotation to generate a plurality of sub per object indexes ("sub POIs"), the plurality of sub POIs comprising at least a target sub POI containing data of the data instance and a source sub POI containing data of a source data instance that the data instance depends on; processing the source data instance to obtain data for the source sub POI; storing the plurality of sub POIs in a POI storage; and causing the plurality of sub POIs to be sent to an indexing engine for generating an index to enable a search on the data instance utilizing the index.

Clause 2: The method of clause 1, wherein the annotation comprises an indication that the data instance depends on the source data instance.

Clause 3: The method of clauses 1-2, wherein the annotation in the annotated schema comprises an indication that a specific element of the annotated schema or a portion thereof is an index.

Clause 4: The method of clauses 1-3, further comprising: identifying related sub POIs that are related to the data instance; processing annotations associated with the related sub POIs to obtain instantiation values from the data instance; creating one or more new sub POIs in response to a determination that one or more new sub POIs need to be created based on the instantiation values; processing the related sub POIs and the one or more new sub POIs utilizing the instantiation values to generate processed sub POIs; and sending the processed sub POIs to the POI storage.

Clause 5: The method of clauses 1-4, further comprising: receiving an update to a data instance; identifying sub POIs in the POI storage that are related to the data instance; generating sub POI updates for the related sub POIs based on the update to the data instance; and sending the sub POI updates to the POI storage to update the related sub POIs.

Clause 6: The method of clauses 1-5, wherein individual ones of the sub POI updates comprise at least one of an addition of a new sub POI, a change to an existing sub POI, an indication to delete an existing sub POI or a transform of an existing sub POI.

Clause 7: The method of clauses 1-6, wherein the transform comprises a change to a value of an element of the existing sub POI, and wherein the change comprises a commutative operation on the value of the element.

Clause 8: The method of clauses 1-7, further comprising: receiving one or more queries, analyzing the one or more queries to generate a recommendation for annotating schemas; and annotating the schemas based on the recommendation.

Clause 9: An apparatus comprising: a processor; and a computer storage medium having computer executable instructions stored thereon which, when executed by the processor, cause the processor to register an annotated schema that comprises an annotation for denormalizing data instances of the annotated schema, process a data instance of the annotated schema according to the annotation to generate a plurality of sub per object indexes ("sub POIs"), the plurality of sub POIs comprising at least a target sub POI containing data of the data instance and a source sub POI containing data of a source data instance that the data instance depends on, process the source data instance to obtain data for the source sub POI, and cause the plurality of sub POIs to be stored in a POI storage, the POI storage exposing the plurality of sub POIs to an indexing engine to enable generation of an index based on the plurality of sub POIs so that a search on the data instance can be performed utilizing the index.

Clause 10: The apparatus of clause 9, wherein the annotation comprises an indication that the data instance depends on the source data instance.

Clause 11: The apparatus of clauses 9-10, wherein the computer storage medium has further computer executable instructions for placing a task for processing the source data instance into a task queue in response to a determination that the data instance depends on the source data instance.

Clause 12: The apparatus of clauses 9-11, wherein the source data instance is processed after a predetermined amount of time after the data instance is processed.

Clause 13: The apparatus of clauses 9-12, wherein the source data instance is processed immediately after the data instance is processed.

Clause 14: The apparatus of clauses 9-13, wherein the computer storage medium has further computer executable instructions for: identifying related sub POIs that are related to the data instance; processing annotations associated with the related sub POI to obtain instantiation values from the data instance; creating one or more new sub POIs in response to a determination that one or more new sub POIs need to be created based on the instantiation values; processing the related sub POIs and the one or more new sub POIs utilizing the instantiation values to generated processed sub POIs; and sending the processed sub POIs to the POI storage.

Clause 15: The apparatus of clauses 9-14, wherein the computer storage medium has further computer executable instructions for: receiving an update to a data instance; identifying sub POIs in the POI storage that are related to the data instance; generating sub POI updates for the related sub POIs based on the update to the data instance; and sending the sub POI updates to the POI storage for updating the related sub POIs.

Clause 16: A system for denormalizing data instances, the system comprising: one or more computing devices configured to receive an annotated schema comprising an annotation for denormalizing data instances of the annotated schema, the annotation comprising an indication that data instances of the annotated schema are dependent on data instances of another schema; receive a first data instance of the annotated schema; process the first data instance according to the annotation to generate two or more sub per object indexes ("sub POIs") for the first data instance; receive a second data instance of the another schema that the first data instance depends on; process the second data instance to update at least one of the two or more sub POIs that is related to the second data instance; a POI storage configured to store a plurality of sub POIs of a plurality of data instances comprising the two or more sub POIs; and an indexing engine configured to access the plurality of sub POIs in the POI storage, and generate an index for the plurality of data instances to facilitate a search on the plurality of data instances.

Clause 17: The system of clause 16, wherein the annotation in the annotated schema further comprises an indication that a specific element of the schema or a portion thereof is to be indexed.

Clause 18: The system of clauses 16-17, wherein processing the second data instance comprises: identifying related sub POIs that are related to the second data instance; processing annotations associated with the related sub POI to obtain instantiation values from the second data instance; creating one or more new sub POIs in response to a determination that one or more new sub POIs need to be created based on the instantiation values; processing the related sub POIs and the one or more new sub POIs utilizing the instantiation values to generated processed sub POIs; and sending the processed sub POIs to the POI storage.

Clause 19: The system of clauses 16-18, wherein the annotation comprises one or more elements to be replaced by instantiation values of the elements obtained from data instances, and wherein processing the sub POIs is performed by calling an operator configured to process the instantiation values into the sub POIs.

Clause 20: The system of clauses 16-19, wherein the one or more computing devices are further configured to: receive an update to a data instance; identify sub POIs in the POI storage that are related to the data instance; generate sub POI updates for the related sub POIs based on the update to the data instance; and send the sub POI updates to the POI storage to update the related sub POIs.

Based on the foregoing, it should be appreciated that concepts and technologies for denormalizing data instances are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes can be made to the subject matter described herein without following the example aspects and applications illustrated and described, and without departing from the true spirit and scope of the present invention, which is set forth in the following claims.

What is claimed is:

1. A computer-implemented method for denormalizing data instances, the method comprising:
    receiving an annotated schema comprising an annotation for denormalizing data instances of the annotated schema;
    processing a data instance of the annotated schema according to the annotation to generate a plurality of sub per object indexes ("sub POIs"), the plurality of sub POIs comprising at least a target sub POI to store data of the data instance and a source sub POI to store data of a source data instance that the data instance depends on, wherein the data instance is linked to the source data instance through a normalized data relationship;
    processing the source data instance to obtain data values for the source sub POI;
    populating the data values from the source data instance into the source sub POI;
    storing the plurality of sub POIs in a POI storage, wherein the plurality of sub POIs represent a denormalized form of the data values stored in the normalized data relationship among the data instance and the source data instance; and
    causing the plurality of sub POIs to be sent to an indexing engine, the indexing engine configured to generate an index to enable a search on the denormalized form of the data values utilizing the index.

2. The method of claim 1, wherein the annotation comprises an indication that the data instance depends on the source data instance.

3. The method of claim 1, wherein the annotation in the annotated schema comprises an indication that a specific element of the annotated schema or a portion thereof is an index.

4. The method of claim 1, further comprising:
    identifying related sub POIs that are related to the data instance;
    processing annotations associated with the related sub POIs to obtain instantiation values from the data instance;
    creating one or more new sub POIs in response to a determination that one or more new sub POIs need to be created based on the instantiation values;
    processing the related sub POIs and the one or more new sub POIs utilizing the instantiation values to generate processed sub POIs; and
    sending the processed sub POIs to the POI storage.

5. The method of claim 1, further comprising:
    receiving an update to a data instance;
    identifying sub POIs in the POI storage that are related to the data instance;
    generating sub POI updates for the related sub POIs based on the update to the data instance; and
    sending the sub POI updates to the POI storage to update the related sub POIs.

6. The method of claim 5, wherein individual ones of the sub POI updates comprise at least one of an addition of a new sub POI, a change to an existing sub POI, an indication to delete an existing sub POI, or a transform of an existing sub POI.

7. The method of claim 6, wherein the transform comprises a change to a value of an element of the existing sub POI, and wherein the change comprises a commutative operation on the value of the element.

8. The method of claim 1, further comprising:
    receiving one or more queries;
    analyzing the one or more queries to generate a recommendation for annotating schemas; and
    annotating the schemas based on the recommendation.

9. An apparatus comprising:
    a processor; and
    a computer storage medium having computer executable instructions stored thereon which, when executed by the processor, cause the processor to:
        register an annotated schema that comprises an annotation for denormalizing data instances of the annotated schema, process a data instance of the annotated schema according to the annotation to generate a plurality of sub per object indexes ("sub POIs"), the plurality of sub POIs comprising at least a target sub POI to store data of the data instance and a source sub POI to store data of a source data instance that the data instance depends on, wherein the data instance is linked to the source data instance through a normalized data relationship, process the source data instance to obtain data values for the source sub POI, populate the data values from the source data instance into the source sub POI, and cause the plurality of sub POIs to be stored in a POI storage, the POI storage exposing the plurality of sub POIs to an indexing engine to enable generation of an index based on the plurality of sub POIs so that a search on the data instance can be performed utilizing the index, wherein the plurality of sub POIs represent a denormalized form of the data values stored in the normalized data relationship among the data instance and the source data instance, and wherein the search is performed on the denormalized form of the data values utilizing the index.

10. The apparatus of claim 9, wherein the annotation comprises an indication that the data instance depends on the source data instance.

11. The apparatus of claim 10, wherein the computer storage medium has further computer executable instructions for placing a task for processing the source data instance into a task queue in response to a determination that the data instance depends on the source data instance.

12. The apparatus of claim 9, wherein the source data instance is processed after a predetermined amount of time after the data instance is processed.

13. The apparatus of claim 9, wherein the source data instance is processed immediately after the data instance is processed.

14. The apparatus of claim 9, wherein the computer storage medium has further computer executable instructions for:
identifying related sub POIs that are related to the data instance;
processing annotations associated with the related sub POI to obtain instantiation values from the data instance;
creating one or more new sub POIs in response to a determination that one or more new sub POIs need to be created based on the instantiation values;
processing the related sub POIs and the one or more new sub POIs utilizing the instantiation values to generated processed sub POIs; and
sending the processed sub POIs to the POI storage.

15. The apparatus of claim 9, wherein the computer storage medium has further computer executable instructions for:
receiving an update to a data instance;
identifying sub POIs in the POI storage that are related to the data instance;
generating sub POI updates for the related sub POIs based on the update to the data instance; and
sending the sub POI updates to the POI storage for updating the related sub POIs.

16. A system for denormalizing data instances, the system comprising:
one or more computing devices configured to:
receive an annotated schema comprising an annotation for denormalizing data instances of the annotated schema, the annotation comprising an indication that data instances of the annotated schema are dependent on data instances of another schema;
receive a first data instance of the annotated schema;
process the first data instance according to the annotation to generate two or more sub per object indexes ("sub POIs") for the first data instance;
receive a second data instance of the another schema that the first data instance depends on, wherein the second data instance is linked to the first data instance through a normalized data relationship; and
process the second data instance to update at least one of the two or more sub POIs that is related to the second data instance, wherein the plurality of sub POIs represent a denormalized form of data values stored in the normalized data relationship among the second data instance and the first data instance; and
a POI storage configured to store a plurality of sub POIs of a plurality of data instances comprising the two or more sub POIs; and
an indexing engine configured to:
access the plurality of sub POIs in the POI storage, and
generate an index for the plurality of data instances to facilitate a search on the denormalized form of data values utilizing the index.

17. The system of claim 16, wherein the annotation in the annotated schema further comprises an indication that a specific element of the schema or a portion thereof is to be indexed.

18. The system of claim 16, wherein processing the second data instance comprises:
identifying related sub POIs that are related to the second data instance;
processing annotations associated with the related sub POI to obtain instantiation values from the second data instance;
creating one or more new sub POIs in response to a determination that one or more new sub POIs need to be created based on the instantiation values;
processing the related sub POIs and the one or more new sub POIs utilizing the instantiation values to generated processed sub POIs; and
sending the processed sub POIs to the POI storage.

19. The system of claim 18, wherein the annotation comprises one or more elements to be replaced by instantiation values of the elements obtained from data instances, and wherein processing the sub POIs is performed by calling an operator configured to process the instantiation values into the sub POIs.

20. The system of claim 16, wherein the one or more computing devices are further configured to:
receive an update to a data instance;
identify sub POIs in the POI storage that are related to the data instance;
generate sub POI updates for the related sub POIs based on the update to the data instance; and
send the sub POI updates to the POI storage to update the related sub POIs.

* * * * *